(12) United States Patent
Wiegman

(10) Patent No.: US 11,714,427 B2
(45) Date of Patent: Aug. 1, 2023

(54) METHODS AND SYSTEMS FOR A DISTRIBUTED CONTROL SYSTEM WITH SUPPLEMENTAL ATTITUDE ADJUSTMENT

(71) Applicant: BETA AIR, LLC, South Burlington, VT (US)

(72) Inventor: Herman Wiegman, South Burlington, VT (US)

(73) Assignee: BETA AIR, LLC, South Burlington, VT (US)

(*) Notice: Subject to any disclaimer, the term of this patent is extended or adjusted under 35 U.S.C. 154(b) by 0 days.

(21) Appl. No.: 17/949,816

(22) Filed: Sep. 21, 2022

(65) Prior Publication Data
US 2023/0152822 A1    May 18, 2023

Related U.S. Application Data

(63) Continuation of application No. 17/526,499, filed on Nov. 15, 2021, now Pat. No. 11,467,606.

(51) Int. Cl.
| | | |
|---|---|---|
| *G05D 1/00* | (2006.01) | |
| *G05D 1/08* | (2006.01) | |
| *B64C 13/04* | (2006.01) | |
| *G05D 1/06* | (2006.01) | |
| *G05D 1/04* | (2006.01) | |

(52) U.S. Cl.
CPC ......... *G05D 1/085* (2013.01); *B64C 13/0421* (2018.01); *G05D 1/042* (2013.01); *G05D 1/0607* (2013.01)

(58) Field of Classification Search
CPC ...... G05D 1/085; G05D 1/042; G05D 1/0607; B64C 13/0421
See application file for complete search history.

(56) References Cited

U.S. PATENT DOCUMENTS 10,124,882 B2 * 11/2018 Golborne ................ B64C 27/56

* cited by examiner

*Primary Examiner* — Ian Jen
(74) *Attorney, Agent, or Firm* — Caldwell Intellectual Property Law

(57) ABSTRACT

A distributed control system with supplemental attitude adjustment including an aircraft control having an engaged state and a disengaged state. The system also including a plurality of flight components and a plurality of aircraft components communicatively connected to the plurality of flight components, wherein each aircraft component is configured to receive an aircraft command and generate a response command directing the flight components as a function of supplemental attitude. The supplemental attitude based at least in part on the engagement datum and generating a supplemental attitude includes choosing a position supplemental attitude if the aircraft control is disengaged and choosing a velocity supplemental attitude if the aircraft control is engaged. In generating the response command, the aircraft attitude is combined with the supplemental attitude to obtain an aggregate attitude, and the aircraft component is configured to generate the response command based on the aggregate attitude.

20 Claims, 11 Drawing Sheets

METHODS AND SYSTEMS FOR A DISTRIBUTED CONTROL SYSTEM WITH SUPPLEMENTAL ATTITUDE ADJUSTMENT

CROSS-REFERENCE TO RELATED APPLICATIONS

This application is a continuation of Non-provisional application Ser. No. 17/526,499 filed on Nov. 15, 2021 and entitled "METHODS AND SYSTEMS FOR A DISTRIBUTED CONTROL SYSTEM WITH SUPPLEMENTAL ATTITUDE ADJUSTMENT," the entirety of which is incorporated herein by reference.

FIELD OF THE INVENTION

The present invention generally relates to the field of distributed aircraft control systems. In particular, the present invention is directed to methods and systems for a distributed control system with supplemental attitude adjustment.

BACKGROUND

Aircraft are frequently subject to drift due to wind or sensor noise. This drift can cause the aircraft to deviate from the pilot's intended flight path. This makes the aircraft more difficult and less precise to control. Additionally, many modern aircraft use fly-by-wire systems to control the aircraft. The failure of these systems can be catastrophic, yet, they can fail even with a single point of failure. Thus, a solution is needed to compensate for the drift experienced by aircraft and to provide a more robust and failure resistant fly-by-wire system.

SUMMARY OF THE DISCLOSURE

In an aspect, a distributed control system with supplemental attitude adjustment includes an aircraft control, the aircraft control located within an aircraft having an aircraft attitude, a plurality of flight components located within an aircraft having an aircraft attitude, a plurality of aircraft components communicatively connected to the plurality of flight components, wherein each aircraft component of the plurality of aircraft components is configured to receive, from a command sensor attached to the aircraft control, an aircraft command and generate a response command directing the flight components as a function of an aggregate attitude, wherein the aggregate attitude combines a supplemental attitude with the aircraft attitude.

In another aspect, a method of distributed control with supplemental attitude adjustment includes receiving, by a plurality of aircraft components communicatively connected to a plurality of flight components, the plurality of aircraft components and the plurality of flight components located within an aircraft having an aircraft attitude, an aircraft command, wherein the aircraft command is received from a command sensor attached to an aircraft control, generating, by the plurality of aircraft components, a response command directing the flight components as a function of an aggregate attitude, wherein the aggregate attitude combines a supplemental attitude with the aircraft attitude.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 7. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to systems and methods for a distributed control system that incorporates supplemental attitude adjustment. In an embodiment, an aircraft control may be monitored to see if it is engaged. If the aircraft control is engaged, a velocity based supplemental attitude generator may be used to supply a supplemental attitude to counteract drift. If the aircraft control is disengaged, a position based supplemental attitude generator may be used to supply a supplemental attitude to counteract drift.

Aspects of the present disclosure can be used to implement a distributed flight control system. The distributed flight control system is capable of using supplemental attitude adjustment to counteract drift.

Figure 1:
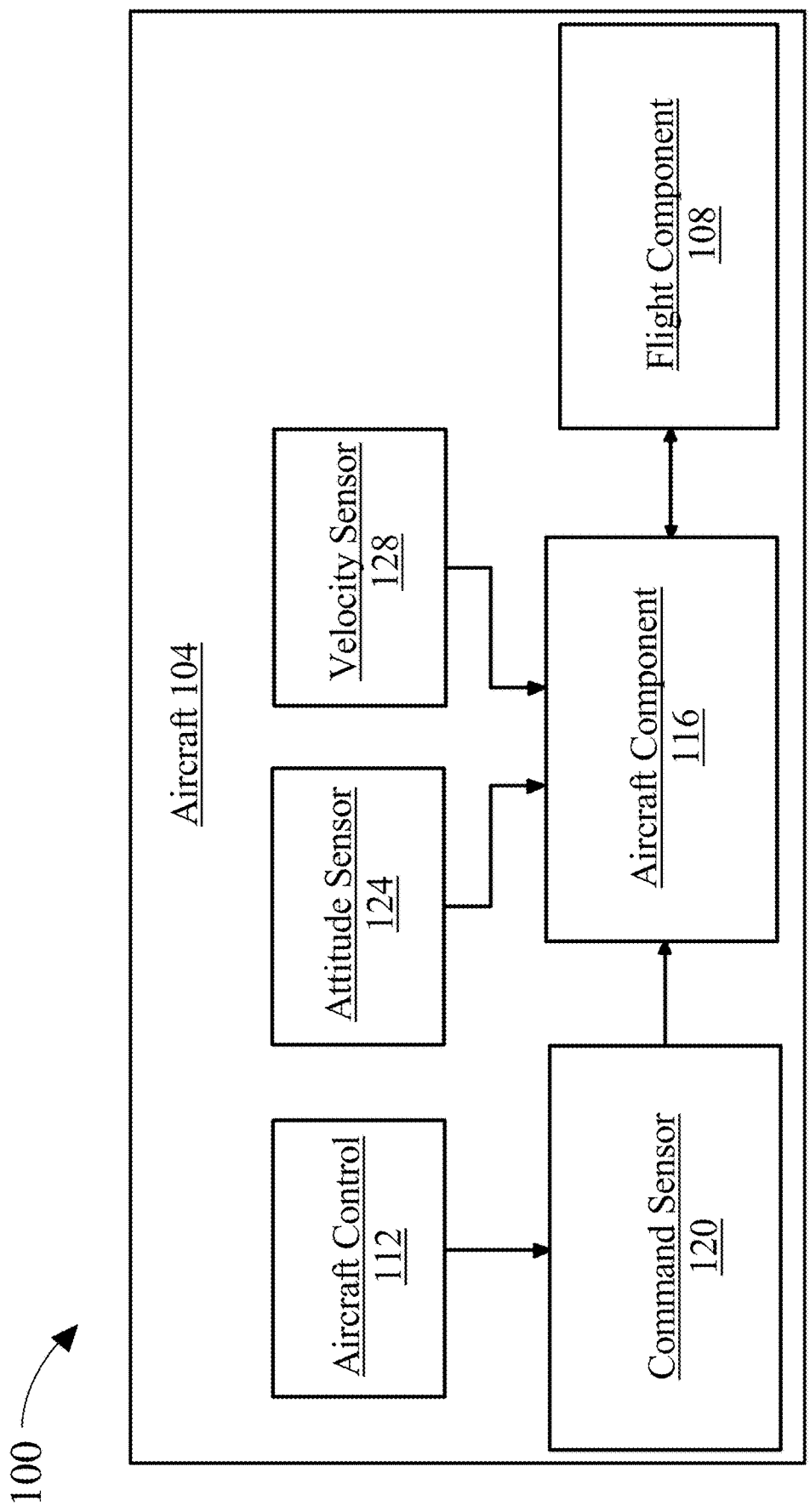
FIG. 1 is a diagram of an exemplary embodiment of a system for distributed control of an aircraft.

Referring now to FIG. 1, an exemplary embodiment of a system 100 for distributed control of an aircraft 104 is illustrated. As used in this disclosure an "aircraft" vehicle that may fly by gaining support from the air. As a non-limiting example, aircraft may include airplanes, helicopters, airships, blimps, gliders, paramotors, and the like thereof Aircraft 104 may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

Still referring to FIG. 1, system 100 includes a flight component 108. In some embodiments, system 100 may include a plurality of flight components 108. As used in this disclosure a "flight component" is a component that promotes flight and guidance of an aircraft. In an embodiment, flight component 108 may be mechanically coupled and/or attached to aircraft 104. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. As used in this disclosure an "aircraft" is vehicle that may fly by gaining support from the air. Furthermore, in an embodiment, mechanical coupling may be used to join two pieces of rotating electric aircraft components.

With continued reference to FIG. 1, the plurality of flight components 108 may be configured to produce a torque. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, plurality of flight components 108 may include a component used to produce a torque that affects the aircrafts' roll and pitch which may comprise one or more ailerons, defined herein as hinged surfaces which form part of the trailing edge of each wing in a fixed wing aircraft, and which may be moved via mechanical means such as without limitation servomotors, mechanical linkages, or the like, to name a few. As a further example, the plurality of flight components 108 may include a rudder, which may include, without limitation, a segmented rudder that produces a torque about a vertical axis. Additionally or alternatively, the plurality of flight components 108 may include other flight control surfaces such as propulsors, rotating flight controls, or any other structural features which can adjust the movement of the aircraft, wherein propulsors may include one or more puller components and/or pusher components as described below in detail, in reference to FIG. 2. Plurality of flight components 108 may include one or more rotors, turbines, ducted fans, paddle wheels, and/or other components configured to propel a vehicle through a fluid medium including, but not limited to air.

In another embodiment, and still referring to FIG. 1, propulsor may include a propeller, a blade, or any combination of the two. The function of a propeller is to convert rotary motion from an engine or other power source into a swirling slipstream which pushes the propeller forwards or backwards. Propulsor may include a rotating power-driven hub, to which are attached several radial airfoil-section blades such that the whole assembly rotates about a longitudinal axis. As a non-limiting example, the blade pitch of the propellers may be fixed at a fixed angle, manually variable to a few set positions, automatically variable (e.g. a "constant-speed" type), and/or any combination thereof as described further above. As used in this disclosure a "fixed angle" is an angle that is secured and/or unmovable from the attachment point. For example, and without limitation, a fixed angle may be an angle of 2.2° inward and/or 1.7° forward. As a further non-limiting example, a fixed angle may be an angle of 3.6° outward and/or 2.7° backward. In an embodiment, propellers for an aircraft are designed to be fixed to their hub at an angle similar to the thread on a screw makes an angle to the shaft; this angle may be referred to as a pitch or pitch angle which will determine the speed of the forward movement as the blade rotates. Additionally or alternatively, propulsor component may be configured at a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

Still referring to FIG. 1, propulsor may include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

With continued reference to FIG. 1, plurality of flight components 108 may include power sources, control links to one or more elements, fuses, and/or mechanical couplings used to drive and/or control any other flight component. Plurality of flight components 108 may include a motor that operates to move one or more flight control components, to drive one or more propulsors, or the like. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking.

Still referring to FIG. 1, plurality of flight components 108 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which system 100 may be incorporated.

In an embodiment, and still referring to FIG. 1, an energy source may be used to provide a steady supply of electrical power to a load over the course of a flight by a vehicle or other electric aircraft. For example, the energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, the energy source may be capable of providing sufficient electrical power for auxiliary loads including without limitation, lighting, navigation, communications, de-icing, steering or other systems requiring power or energy. Further, the energy source may be capable of providing sufficient power for controlled descent and landing protocols, including, without limitation, hovering descent or runway landing. As used herein the energy source may have high power density where the electrical power an energy source can usefully produce per unit of volume and/or mass is relatively high. The electrical power is defined as the rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 1, an energy source may include a plurality of energy sources, referred to herein as a module of energy sources. The module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of at least an energy source may be based on the individual battery cell performance or an extrapolation based on the measurement of at least an electrical parameter. In an embodiment where the energy source includes a plurality of battery cells, the overall power output capacity may be dependent on the electrical parameters of each individual cell. If one cell experiences high self-discharge during demand, power drawn from at least an energy source may be decreased to avoid damage to the weakest cell. The energy source may further include, without limitation, wiring, conduit, housing, cooling system and battery management system. Persons skilled in the art will be aware, after reviewing the entirety of this disclosure, of many different components of an energy source.

Still referring to FIG. 1, an aircraft control 112 is located within system 100. As used in this disclosure an "aircraft control" is a control and/or guidance system that maneuvers the aircraft. In an embodiment, aircraft control 112 may include a mechanical and/or manually operated flight control system. For example, and without limitation aircraft control 112 may include a collective control. As used in this disclosure a "collective control" is a mechanical control of an aircraft that allows a pilot and/or other operator to adjust and/or control the pitch angle of aircraft 104. For example and without limitation, collective control may alter and/or adjust a pitch angle of all the main rotor blades collectively. For example, and without limitation aircraft control 112 may include a yoke control. As used in this disclosure a "yoke control" is a mechanical control of an aircraft to control the pitch and/or roll. For example and without limitation, yoke control may alter and/or adjust the roll angle of aircraft 104 as a function of controlling and/or maneuvering ailerons. In an embodiment, aircraft control 112 may include one or more foot brakes, control sticks, pedals, throttle levels, and the like thereof. Additionally or alternatively, aircraft control 112 may be configured to translate a desired command. As used in this disclosure a "desired command" is a direction and/or command that a pilot desires, wishes, and/or wants for a flight component. In an embodiment, and without limitation, desired command may include a desired torque for flight component 108. For example, and without limitation, aircraft control 112 may translate that a desired torque for a propeller be 160 lb. ft. of torque. As a further non-limiting example, aircraft control 112 may translate that a pilot's desired torque for a propulsor be 290 lb. ft. of torque. In another embodiment, aircraft control 112 may include a digital and/or automated flight control system. For example, and without limitation, aircraft control 112 may include a computing device and/or flight controller capable of producing an autonomous function, wherein an autonomous function is described below in detail, in reference to FIG. 4. In an embodiment, aircraft control 112 may include storing a flight plan and/or flight path. For example, and without limitation, aircraft control 112 may store a flight plan in a localized memory and/or memory cache of a first aircraft component, wherein a plurality of segments of the flight plan may be stored in a plurality of aircraft components of aircraft 104, wherein an aircraft component is described below in detail. In some embodiments, aircraft control 112 may be a joystick. For the purposes of this disclosure, a "joystick" is a control system including a stick that pivots on its base and reports on the angle or position of the stick.

Still referring to FIG. 1, system 100 includes an aircraft component 116 attached to flight component 108 of the plurality of flight components. As used in this disclosure an "aircraft component" is a logic circuit communicatively connected to a flight component, that may be configured to perform steps and/or actions as described in further detail below. "Communicatively connected," for the purpose of this disclosure, means connected such that data can be transmitted, whether wirelessly or wired. In an embodiment, and without limitation, aircraft component may include one or more application-specific integrated circuits (ASICs), field-programmable gate arrays (FPGAs), multiplexors, registers, arithmetic logic units (ALUs), computer memory caches, microprocessors, computing devices, and the like thereof. In an embodiment, system 100 may include a plurality of aircraft components 116. Aircraft component 116 may include any computing device as described in this disclosure, including without limitation a microcontroller, digital signal processor (DSP) and/or system on a chip (SoC) as described in this disclosure. Computing device may include, be included in, and/or communicate with a mobile device such as a mobile telephone or smartphone. Aircraft component 116 may include a single computing device operating independently, or may include two or more computing device operating in concert, in parallel, sequentially or the like; two or more computing devices may be included together in a single computing device or in two or more computing devices. Aircraft component 116 may interface or communicate with one or more additional devices as described below in further detail via a network interface device. Network interface device may be utilized for connecting aircraft component 116 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Aircraft component 116 may include but is not limited to, for example, a computing device or cluster of computing devices in a first location and a second computing device or cluster of computing devices in a second location. Aircraft component 116 may include one or more computing devices dedicated to data storage, security, distribution of traffic for load balancing, and the like. Aircraft component 116 may distribute one or more computing tasks as described below across a plurality of computing devices of computing device, which may operate in parallel, in series, redundantly, or in any other manner used for distribution of tasks or memory between computing devices. Aircraft component 116 may be implemented using a "shared nothing" architecture in which data is cached at the worker, in an embodiment, this may enable scalability of system 100 and/or computing device.

With continued reference to FIG. 1, aircraft component 116 may be designed and/or configured to perform any method, method step, or sequence of method steps in any embodiment described in this disclosure, in any order and with any degree of repetition. For instance, aircraft component 116 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Aircraft component 116 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, aircraft component 116 is configured to receive an aircraft command. As used in this disclosure an "aircraft command" is a command directing a flight component to perform an action and/or motion. However, in some embodiments, flight component may receive an aircraft command from a flight controller. In an embodiment, and without limitation, aircraft command may include a command to increase and/or enhance a thrust force generated by a propulsor to provide lift to aircraft 104. For example, and without limitation, aircraft command may instruct a propeller to increase a first revolutions per minute of 2,000 to a second revolutions per minute of 4,000. In an embodiment, and without limitation, aircraft command may include a command to alter and/or shift about an axis. For example, and without limitation, aircraft command may include a command to rotate a rudder 3° about a vertical axis. In another embodiment, and without limitation, aircraft command may include a command to reduce and/or reverse a first torque magnitude and/or direction. As a non-limiting example, aircraft command may command a propeller that has a first torque of 12 Nm to reduce the torque to 2 Nm. In an embodiment, and without limitation, aircraft command may include one or more commands to direct a flight component to alter a heading, speed, altitude, departure angle, approach angle, route paths, and the like thereof.

Still referring to FIG. 1, aircraft component 116 is configured to receive aircraft command from a command sensor 120 attached to aircraft control 112. As used in this disclosure a "command sensor" is a device, module, and/or subsystem, utilizing any hardware, software, and/or any combination thereof to detect events and/or changes to aircraft 104 as a function aircraft control 112. For example, and without limitation, command sensor may detect events as a function of one or more modifications of aircraft control 112, modifications compared to a flight plan, and the like thereof. For example, and without limitation, command sensor 120 may be configured to detect one or more changes in torque, force, thrust, pitch angle, angle of attack, velocity, momentum, altitude, roll, yaw, and the like thereof. In an embodiment, and without limitation, command sensor 120 may be attached via a mechanically and/or communicatively connected, as described above, to aircraft 104. Additionally or alternatively, command sensor 120 may be configured to detect aircraft command, wherein aircraft command includes a desired output of flight component 108 of the plurality of flight components. As used in this disclosure a "desired output" is an output and/or function that is wanted and/or expected to be performed by flight component 108. For example, and without limitation, desired output may denote that a propeller blade should maintain a rotational velocity of 330 rad/s. As a further non-limiting example, desired output may denote that aircraft 104 should have a pitch angle of 3.7°. As a further non-limiting example, desired output may denote that aircraft 104 should maintain a forward thrust of 800 N. In an embodiment, and without limitation, command sensor 120 may transmit the aircraft command to aircraft component 116. For example, command sensor 120 may transmit aircraft command to aircraft component 116 as a function of one or more communication signals and/or signal codes as described below in detail. As a further non-limiting example, command sensor 120 may transmit aircraft command by converting the aircraft command to a digital electronic signal. As used in this disclosure a "digital electronic signal" is a coded electrical impulse to convey information. As a non-limiting example, digital electronic signal may include a bit that specific a basic unit of information that may be represented using terms and/or symbols such as 1, 0, yes, no, true, false, +, −, on, and/or off.

Still referring to FIG. 1, aircraft component 116 is configured to receive an engagement datum from the command sensor 120. An "engagement datum" is a piece of data that indicates whether aircraft control 112 is engaged. In some embodiments, engagement datum may be a "0" or a "1." As a non-limiting example, the engagement datum may be "1" when aircraft control 112 is engaged. Additionally, as a non-limiting example, the engagement datum may be "0" when aircraft control 112 is disengaged. Aircraft control 112 may be disengaged, for example, when aircraft control 112 is detected to be at its default position. In another embodiment, aircraft control 112 may be disengaged when aircraft control 112 is detected to be within a first threshold from its default position. As a non-limiting example a joystick is generally spring-centered, so that, when the joystick is not disengaged, it returns to a vertical position. Aircraft control 112 may be detected to be engaged when aircraft control 112 is detected to be outside of a second threshold from its default position. In some embodiments, first tolerance amount may be different from each other. In other embodiments, first tolerance amount may be equal to second tolerance amount. First and second tolerance amount may be numerical measurements, or they may be expressed as percentages.

In another embodiment, and still referring to FIG. 1, command sensor 120 may be configured to detect one or more statuses of aircraft 104 as a function of aircraft control 112. For example and without limitation, a status of aircraft 104 may include datum representing one or more conditions of the energy source and/or motor. One or more conditions may include, without limitation, voltage levels, electromotive force, current levels, temperature, current speed of rotation, and the like. Command sensor 120 may further include detecting electrical parameters. Electrical parameters may include, without limitation, voltage, current, ohmic resistance of a flight component. Command sensor 120 may include one or more environmental sensors, which may function to sense parameters of the environment surrounding the aircraft. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, command sensor 120 may include at least a geospatial sensor. Command sensor 120 may be located inside an aircraft; and/or be included in and/or attached to at least a portion of the aircraft. Command sensor 120 may include one or more proximity sensors, displacement sensors, vibration sensors, and the like thereof. Command sensor 120 may be comprised of one or more gyroscopes, accelerometers, magnetometers, inertial measurement units, pressure sensors. Command sensor 120 may be used to monitor the status of aircraft 104 for both critical and non-critical functions. Command sensor 120 may be incorporated into vehicle or aircraft or be remote.

With continued reference to FIG. 1, in some embodiments, command sensor 120 may be communicatively connected to an aircraft control component. Aircraft control component may be configured to calculate the displacement of the aircraft control 112 from a default position, compare the displacement of the aircraft control 112 against the first threshold, and transmit an engagement datum to a command sensor 120 to indicate whether aircraft control 112 is engaged or disengaged. In some embodiments, aircraft control component may compare the displacement of the aircraft control 112 against the second threshold. Aircraft control component may be configured to perform steps and/or actions as described in further detail below. In an embodiment, and without limitation, aircraft control component may include or more application-specific integrated circuits (ASICs), field-programmable gate arrays (FPGAs), multiplexors, registers, arithmetic logic units (ALUs), computer memory caches, microprocessors, computing devices, and the like. In an embodiment, system 100 may include a plurality of aircraft control components. Aircraft control component may include any computing device as described in this disclosure.

Still referring to FIG. 1, aircraft component 116 is configured to obtain, from an attitude sensor 124, an aircraft orientation. As used in this disclosure an "attitude sensor" is a device, module, and/or subsystem, utilizing any hardware, software, and/or any combination thereof to detect an attitude and/or orientation of aircraft 104. For example, and without limitation, attitude sensor 124 may include one or more sensors similar to command sensor 120. In an embodiment, and without limitation, attitude sensor 124 may include a proximity sensor, pressure sensor, light sensor, pitot tubes, air speed sensor, and the like thereof. For example, attitude sensor 124 may include a motion sensor configured to detect motion in three or more dimensions and/or orientation in three dimensions of aircraft 104. For example, and without limitation, a motion sensor may include a MEMS sensor, inertial measurement unit (IMU), an accelerometer, wherein one or more accelerometers may include a plurality of accelerometers, such as three or more accelerometers positioned to span three dimensions of possible acceleration, so that any direction and magnitude of acceleration in three dimensions may be detected and measured in three dimensions, and the like thereof. Attitude sensor 124 may include one or more gyroscopes; one or more gyroscopes may include a plurality of gyroscopes, such as three or more gyroscopes positioned to span three dimensions of possible acceleration, so that any direction and magnitude of change in angular position in three dimensions may be detected and measured in three dimensions. Attitude sensor 124 may include one or more magnetic sensors or magnetometers such as Hall effect sensors, compasses such as solid-state compasses, or the like; one or more magnetometers may include a plurality of magnetometers, such as three or more magnetometers positioned to span three dimensions of possible orientation, so that any direction and magnitude of change in magnetic field in three dimensions may be detected and measured in three dimensions, possibly for measurement of the aircraft's orientation to the Earth's true North or detection of magnetic anomalies.

In an embodiment, and without limitation, attitude sensor 124 may include one or more navigation facility receivers. As used in this disclosure a "navigation facility receiver" is sensor and/or receiver that may locate and/or identify a location of an aircraft with respect to a geolocation. For example and without limitation, navigation facility receiver may include a global positioning system (GPS) receiver. As a further non-limiting example, navigation facility receiver may include a global navigation satellite system (GLONASS) receiver. As a further non-limiting example, navigation facility receiver may include a BeiDou receiver. As a further non-limiting example, navigation facility receiver may include a Galileo receiver. As a further non-limiting example, navigation facility may include a NAVIC receiver. In an embodiment, navigation facility receiver may include one or more satellite constellation receivers and/or similar emitting systems that can calculate a location based on the time and/or phase difference of the receiver signals. In an embodiment, and without limitation, navigation facility receiver may include a receiving antenna, accompanying circuits, and processing. One or more navigation facility receivers may be configured to determine the orientation of the aircraft in relation to the Earth's true North, using differential GPS, phase differences, and/or other methods to exploit the satellite constellations and their positions. One or more facility navigation receivers may be configured to receive and determine the local time based on the time information received from the satellite signals. One or more navigation facility receivers may receive position and timing signals, and the like and convert such detected signals into electrical signals, which may be processed further by aircraft component 116.

In an embodiment, and still referring to FIG. 1, attitude sensor 124 may detect a topographical datum. As used in this disclosure a "topographical datum" is an element of datum representing the arrangement and/or location of a physical feature of a geolocation. For example, and without limitation, topographical datum may include one or more elements of datum denoting a mountain range, skyscraper, river, ridge, ocean, lake, vehicle, animal, person, street, field, tree, and the like thereof. In an embodiment, and without limitation, attitude sensor 124 may include a light radar component. As used in this disclosure a "light radar component" is an active imaging source that transmits light toward an object or field of interest and detects back-scattered or reflected light, measuring time of flight (ToF), interferometry, and/or phase of such back-scattered and/or reflected light to compute distances to, velocities, and/or accelerations of objects at points from which back-scatter and/or reflection occurred. In an embodiment, the wavelength of light may be outside the range of visible light; for instance, and without limitation, wavelength may be in the infrared range as described above. Light radar component may include a "flash lidar" component, mechanical or non-mechanical beam steering, light patterns, and/or computational imaging methods, such as plenoptic or other multi-aperture embodiments. In an embodiment, and without limitation, light radar component may include one or more optical elements for focusing, collimating, and/or transmitting light emitted by light source. In an embodiment, intensity and/or focus may default to minimally harmful settings, permitting allowing ToF ranging or the like to determine a distance to a nearest topographical data point and/or ground point. Light radar component may include detectors that may be sensitive specifically to a narrow band of wavelengths transmitted by light source, and/or may be sensitive to a range of wavelengths that includes the band transmitted by the light source. Detectors may be designed to react quickly to initial detection of photons, for instance through use of APDs or other highly sensitive detectors. Still referring to FIG. 1, an "aircraft orientation," as used herein, is an aircraft attitude about a three-axis system. As used in this disclosure a "three-axis system" is region of space represented by three dimensions that share a similar origin. For example, and without limitation, three-axis system may include a more yaw, pitch, and/or roll axis. As used in this disclosure a "yaw axis" is an axis that is directed towards the bottom of the aircraft, perpendicular to the wings. For example, and without limitation, a positive yawing motion may include adjusting and/or shifting the nose of aircraft 104 to the right about the vertical axis. As used in this disclosure a "pitch axis" is an axis that is directed towards the right laterally extending wing of the aircraft. For example, and without limitation, a positive pitching motion may include adjusting and/or shifting the nose of aircraft 104 upwards about the horizontal axis. As used in this disclosure a "roll axis" is an axis that is directed longitudinally towards the nose of the aircraft, parallel to the fuselage. For example, and without limitation, a positive rolling motion may include lifting the left and lowering the right wing concurrently about the longitudinal axis. Additionally or alternatively, attitude sensor 124 may detect aircraft orientation and transmit aircraft orientation to aircraft component 116. For example, attitude sensor 124 may transmit aircraft orientation to aircraft component 116 as a function of one or more communication signals and/or signal codes as described below in detail. As a further non-limiting example, attitude sensor 124 may transmit aircraft orientation by converting the aircraft orientation to a digital electronic signal, wherein a digital electronic signal is a coded electrical impulse to convey information as described above, in detail.

Still referring to FIG. 1, aircraft component 116 is configured to receive an actual velocity from a velocity sensor 128. For the purposes of this disclosure, "velocity" refers to an object rate of movement with respect to a frame of reference. Velocity is generally expressed as a vector, wherein the magnitude of the vector is the speed of the object and the direction of the vector is the direction of the object's movement. For the purposes of this disclosure "actual velocity" is the velocity of the aircraft 104. In some embodiments, velocity sensor 128 may include a pitot tube. A pitot tube may be used to measure the aircraft's airspeed. As a non-limiting example, a pitot tube may be a tube pointing into the airflow experienced by aircraft 104. As a non-limiting example, a pitot tube may be mounted on the wing of aircraft 104. As another non-limiting example, the pitot tube may be mounted on the forward end of the aircraft 104 fuselage. The pitot tube can measure the dynamic pressure of the airflow experienced by the aircraft 104. In some embodiments, velocity sensor 128 may also include a static port. As a non-limiting example, the static port may be a hole that is flush-mounted on the fuselage of aircraft 104. The static port may be used to measure the static pressure of air. In some embodiments, the velocity sensor 128 may include a Prandtl tube. A Prandtl tube may also be called a pitot-static tube. As a non-limiting example, a Prandtl tube is essentially a pitot tube, with a second co-axial tube with holes on the sides of the device. This second co-axial tube may measure static pressure, whereas the pitot tube can measure dynamic pressure.

Still referring to FIG. 1, velocity sensor 128 may include a sensor configured to detect the direction of the aircraft. In some embodiments, velocity sensor 128 may include an angle of attack vane. An angle of attack vane may be used to measure the difference in angle between the airspeed vector, and a predefined line on an aircraft wing. As a non-limiting example, an angle of attack vane may be used to measure the difference in angle between the airspeed vector and the chord line of the aircraft wing. As a non-limiting example, this measurement may indicate whether aircraft 104 is ascending or descending in altitude. This may be used as a component in calculating the direction of the aircraft 104 velocity vector. In some embodiments, velocity sensor 128 may include a heading sensor. In some embodiments, this heading sensor may be a compass. As a non-limiting example, this compass may indicate the heading of the aircraft using the cardinal directions. This heading may be used as a component in calculating the direction of aircraft 104 velocity vector. In some embodiments, velocity sensor 128 may include a plurality of different sensors, or velocity sensor 128 may include a sensor suite. In some embodiments, velocity sensor may not be a discrete sensor or set of sensors, but, instead, may be made up of sensors chosen from the on-plane sensors of aircraft 104. In some embodiments, velocity sensor 128 may include a variety of other sensors, such as altimeters, altitude and heading reference systems (AHRS), navigation systems like GPS, control surface sensors, temperature sensors, pressure sensors, gyroscopes, accelerometers, and the like.

Still referring to FIG. 1, aircraft component 116 is configured to command flight component 108 of the plurality of flight components to produce a response command. In some embodiments, aircraft component 116 may generate a response command and send the response command to flight component 108. Alternatively, in some embodiments, flight component 108 may receive an instruction from a flight controller and, as a function of this command, generate the response command. As used in this disclosure a "response command" is a command directing a flight component to perform an action and/or motion as a function of the aircraft command and/or aircraft orientation. In an embodiment, and without limitation, response command may include an actuator command. As used in this disclosure an "actuator command" is a direction and/or instruction given to an actuator to move and/or shift a flight component. For example, and without limitation, actuator command may direct an actuator to may adjust a propulsor 4° in the horizontal axis. As a further non, limiting example, actuator command may direct an actuator to may adjust an aileron 2° in the vertical axis. As a further non-limiting example, actuator command may direct a flight component with a first vertical axis, wherein the first vertical axis may include a 2.2° inward and/or 2.7° forward, to maneuver and/or shift the flight component +/−15° in the horizontal and/or longitudinal axis. Additionally or alternatively, response command may include a thrust command. As used in this disclosure a "thrust command" is a direction and/or instruction given to a flight component that produces thrust. For example, and without limitation, thrust command may instruct a propulsor to reduce a first thrust of 8,000 N to a second thrust of 2,000 N. As a further non-limiting example, thrust command may instruct a propulsor to increase an airspeed from a first airspeed of 230 km/h to a second airspeed of 402 km/h.

Still referring to FIG. 1, response command may be produced as a function of determining at least an aircraft response. As used in this disclosure an "aircraft response" is one or more actions an aircraft may perform in response to a change. For example, and without limitation, aircraft response may include decreasing altitude, increasing altitude, reducing airspeed velocity, changing the heading direction, applying a braking force, and the like thereof. In an embodiment, and without limitation, aircraft response may be determined as a function of simulating an aircraft command adjustment. As used in this disclosure an "aircraft command adjustment" is a proposed change and/or modification to aircraft 104 that may elucidate a response. For example, and without limitation, aircraft command adjustment may include a proposed change to shift and/or alter a rudder. As a further non-limiting example, aircraft command adjustment may include a proposed change to increase rotational velocity of a rotor. In an embodiment, aircraft command adjustment may be simulated by detecting a failure event. As used in this disclosure a "failure event" is an element of data identifying a failure of a flight component of the plurality of flight components has occurred. In an embodiment and without limitation, failure event may include rotation degradation. As used in this disclosure "rotation degradation" is a reduced function of flight components such that a loss of control occurs in one of the axis in the three-axis system. As a non-limiting example, rotation degradation may occur due to a rotor in a quadrotor configuration that is not operating at the capacity necessary to maintain the flight plan, wherein the yaw portion of the torque exerted by the remaining rotors is not eliminated and an uncontrollable yaw axis force is exerted. In a further embodiment and without limitation, failure event may include a propulsor that is not generating enough torque to maintain the flight plan.

In an embodiment, and still referring to FIG. 1, aircraft command adjustment may be simulated as a function of a control algorithm. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, aircraft component may simulate one or more adjustments independent of the plurality of second aircraft components. In another embodiment, and without limitation, aircraft component may simulate one or more adjustments in conjunction with the simulation performed by the plurality of second aircraft components. In an embodiment, and without limitation, control algorithm may be configured to generate an autocode, wherein an "auto-code," is used herein, is a code and/or algorithm that is generated as a function of the one or more models and/or software's. In another embodiment, control algorithm may be configured to receive a segmented control algorithm. As used in this disclosure a "segmented control algorithm" is control algorithm that has been separated and/or parsed into discrete sections. For example, and without limitation, segmented control algorithm may include a parsed control algorithm into two or more segments, wherein each segment of control algorithm may be performed by one or more aircraft components operating on distinct flight components.

In an embodiment, and still referring to FIG. 1, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 108. In an embodiment, control algorithm may be configured to create an optimized signal communication as a function of segmentation boundary. As used in this disclosure an "optimized signal communication" is an optimized discrete timing of signal communications. For example, and without limitation, optimized signal communication may include identifying the discrete timing required to transmit and/or receive the one or more segmentation boundaries. For example, and without limitation optimized signal communication may determine one or more discrete timings to allow for separation of code across communication networks and/or aircraft components attached to the plurality of flight components. The communication network may be consistent with any communication network disclosed in U.S. app. Ser. No. 17/323,637, filed on May 18, 2021, and entitled "SYSTEM AND METHOD FOR DISTRIBUTED CONTROL OF AN AIRCRAFT," the entirety of which is hereby incorporated by reference.

In an embodiment, and still referring to FIG. 1, determining the at least an aircraft response may include receiving a first aircraft command from command sensor 120 attached to aircraft control 112, wherein a first aircraft command may include any of the aircraft command as described above. In an embodiment, and without limitation, aircraft component 116 may obtain from a related flight component of the plurality of flight components an adjustment impact, wherein a related flight component is a second flight component that is distinct from a first flight component. For example, and without limitation, a first flight component may include a propulsor, wherein a second flight component may include a rotor and/or aileron. As used in this disclosure an "adjustment impact" is an effect and/or impact that a change to flight component 108 may have on a related flight component. For example, and without limitation, an adjustment impact may denote that a reduction of torque to a first propulsor may result in an overproduction of torque on a second propulsor. As a further non-limiting example, adjustment impact may denote that a shift of an aileron may result in a torque exerted on the rudder. In an embodiment, and without limitation aircraft component 116 may determine the at least aircraft response as a function of the first aircraft command and the adjustment impact.

Still referring to FIG. 1, system 100 may be configured to include a communication network that allows the aircraft component 116 attached to flight component 108 to communicate with an second aircraft component attached to an alternate flight component, wherein a communication network is a pattern and/or direction in which data and/or signals may flow in system 100. As used in this disclosure an "second aircraft component" is an aircraft component that is different and/or distinct from a first aircraft component. As used in this disclosure an "alternate flight component" is a flight component that is different and/or distinct from a first flight component. For example, and without limitation, an aircraft component attached to a rotor may communicate to an second aircraft component attached to an aileron. As a further non-limiting example, an aircraft component attached to a rudder may communicate to an second aircraft component of a rotor. In an embodiment, aircraft component 116 may communicate with a plurality of second aircraft components as a function of the communication network. As a non-limiting embodiment, flight component may send an outgoing signal to an alternate flight component using the above-mentioned communication network. For example, and without limitation, aircraft component may communicate with the plurality of second aircraft components as a function of one or more chain paths, all-channel paths, and/or neural networks that assign a weighted value to a transmitted datum. As a further non-limiting example, aircraft component may communicate with the plurality of second aircraft components as a function of cooperative processing, parallel processing, and the like thereof. In an embodiment, and without limitation, aircraft component 116 may communicate with an second aircraft component of the plurality of second aircraft components as a function of a wired protocol. As a non-limiting example, aircraft component 116 may communicate with an alternate flight component of the plurality of alternate flight components as a function of a master bus controller, universal asynchronous receiver-transmitters (UART), universal serial buses (USBs), bus architectures, and the like thereof. In another embodiment, and without limitation, aircraft component 116 may communicate with an second aircraft component of the plurality of second aircraft components as a function of a wireless protocol. For example, and without limitation, aircraft component 116 may communicate with an alternate flight component of the plurality of alternate flight components as a function of a communication using radio waves, electric fields, mobile broadband, Wi-Fi, and/or the BLUETOOTH protocol promulgated by Bluetooth SIG, Inc. of Kirkland, Washington, wherein Bluetooth is a wireless technology used for exchanging data between devices over short distances using ultra high frequency radio waves between 2.402 GHz to 2.480 GHz.

In an embodiment, and still referring to FIG. 1, aircraft component 116 may receive an alternate aircraft command from the second aircraft component. As used in this disclosure an "alternate signal" is a communication and/or signal associated with an alternate flight component that is transmitted from an second aircraft component of the plurality of second aircraft components to aircraft component 116. For example, and without limitation, second aircraft component may transmit an alternate signal comprising a propeller rotation of 520 rpms, wherein aircraft component 116, attached to flight component 108, receives the alternate signal. Aircraft component 116 may command flight component 108 as a function of alternate signal. For example, and without limitation, aircraft component 116 may command a rudder to rotate 3° along a vertical axis as a function of an alternate signal relating to an aileron that has raised 1.7° to exert a yaw torque on the aircraft.

Figure 2:
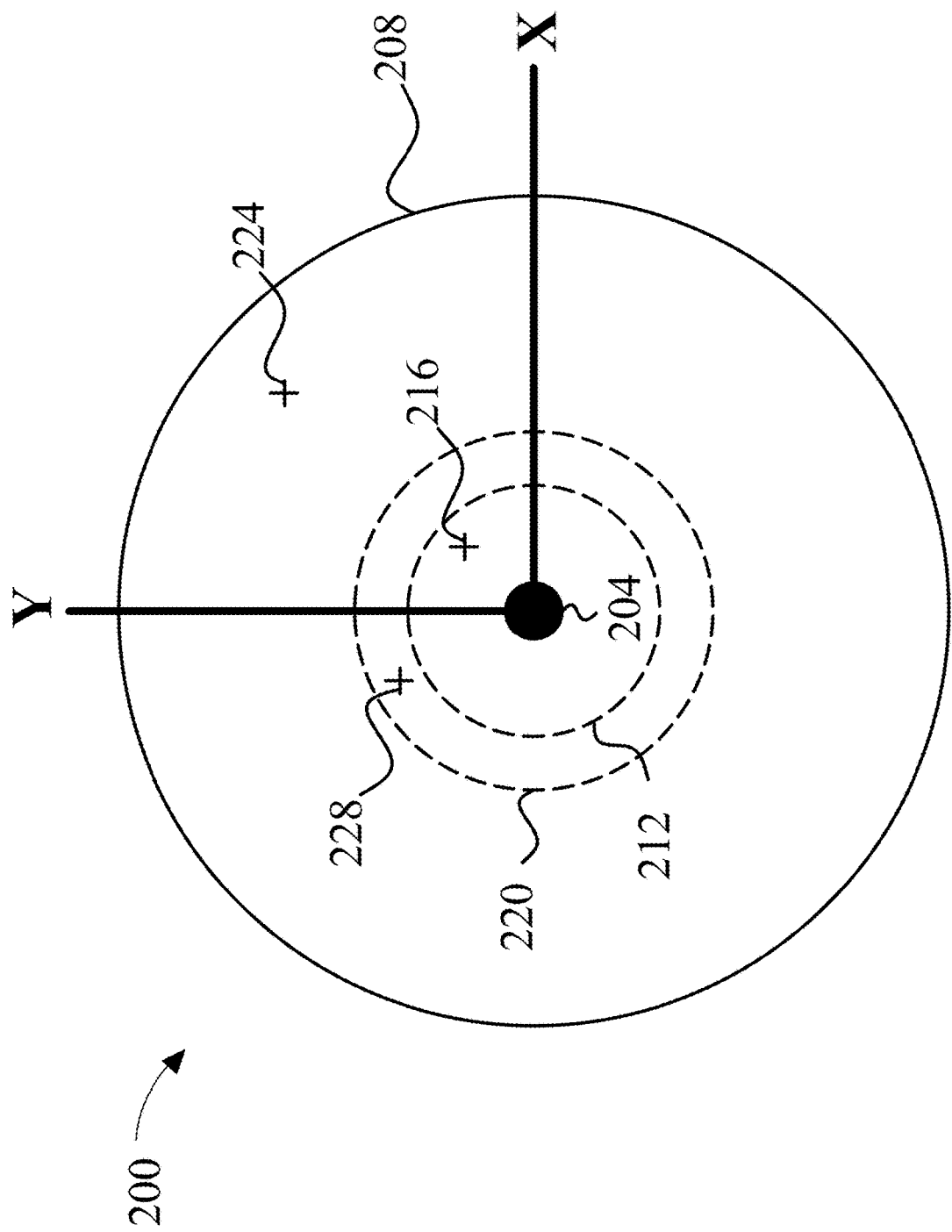
FIG. 2 is a diagram of the range of inputs that may be received by an aircraft control.

Referring now to FIG. 2, an exemplary plot of aircraft control 200 (e.g. aircraft control 112 in FIG. 1) is shown. In particular, FIG. 2 may represent the range of motion of a joystick. Aircraft control 200 may include a default position 204. In some embodiments, default position 204 may be referred to as the spring centered position. For the purposes of this disclosure, the "default position" is the position that aircraft control 200 returns to or rests at when the pilot is not engaging with it. For example, a joystick usually returns to a vertical position when the pilot is not using it. FIG. 2 also shows a maximum range of motion 208 that aircraft control 200 is capable of As a non-limiting example, a yoke may be pushed forward to pitch down the nose of an aircraft and may be pulled back to pitch up the nose of an aircraft. Maximum range of motion 208 may represent the maximum amount that the yoke can be "pushed forward" or "pulled back." As another non-limiting example, a joystick has a fixed range of motion. Generally, a joystick may be tilted in any direction, but may be limited in the tilt that can be achieved. Thus, maximum range of motion 208, may represent the maximum range of motion of a joystick.

With continued reference to FIG. 2, aircraft control 200 may have an associated first threshold value 212. First threshold value 212 may represent a displacement from default position 204. In some embodiments, first threshold value 212 can be plotted on a linear scale. As a non-limiting example, where aircraft control 200 is a pedal, first threshold value 212 may be associated with the depression of the pedal. As a non-limiting embodiment, first threshold value 212 may be plotted on an X-Y plane when aircraft control 200 is a joystick. For example, the angle and tilt of the joystick may be translated into X-Y coordinates. In some embodiments, aircraft control 200 may transmit an engagement datum to a command sensor (e.g. command sensor 120 in FIG. 1). When the displacement of aircraft control 200 is less than first threshold value 212, aircraft control 200 may be considered to be disengaged. When aircraft control 200 is detected to be disengaged (i.e., the displacement of aircraft control 200 is less than first threshold value 212) aircraft control 200 may send an engagement datum to a command sensor (e.g. command sensor 120 in FIG. 1). In some embodiments, engagement datum may be a binary value to indicate that aircraft control 200 is either engaged or disengaged. As a non-limiting example, the engagement datum may be a "0" to indicate that aircraft control 200 has been detected to be disengaged. As a non-limiting example, aircraft control 200 may be detected to be at a first point 216. The displacement of first point 216 may be less than first threshold value 212. In response to this input, in this embodiment, aircraft control 200 may send an engagement datum to a command sensor indicating that aircraft control 200 is disengaged.

With continued reference to FIG. 2, aircraft control 200 may have an associated second threshold value 220. Second threshold value 220 may represent a displacement from default position 204. In some embodiments, second threshold value 220 can be plotted on a linear scale. As a non-limiting example, where aircraft control 200 is a pedal, second threshold value 220 may be associated with the depression of the pedal. As a non-limiting embodiment, second threshold value 220 may be plotted on an X-Y plane when aircraft control 200 is a joystick. For example, the angle and tilt of the joystick may be translated into X-Y coordinates. When the displacement of aircraft control 200 is greater than second threshold value 220, aircraft control 200 may be considered to be engaged. When aircraft control 200 is detected to be engaged (i.e., the displacement of aircraft control 200 is greater than second threshold value 220) aircraft control 200 may send an engagement datum to a command sensor (e.g. command sensor 120 in FIG. 1). As a non-limiting example, the engagement datum may be a "1" to indicate that aircraft control 200 has been detected to be engaged. As a non-limiting example, aircraft control 200 may be detected to be at a second point 224. The displacement of second point 224 may be greater than second threshold value 220. In response to this input, in this embodiment, aircraft control 200 may send an engagement datum to a command sensor indicating that aircraft control 200 is engaged.

With continued reference to FIG. 2, in some embodiments, second threshold value 220 and first threshold value 212 may be the same value. In some other embodiments, second threshold value 220 may be greater than first threshold value 212. When the displacement of aircraft control 200 is greater than first threshold value 212 and less than second threshold value 220, then aircraft control 200 may send an engagement datum to a command sensor that corresponds to the last engagement datum that was sent to the command sensor. As a non-limiting example, aircraft control 200 may be detected to be at a third point 228. Third point 228 may be at a displacement that is less than second threshold value 220 and more than first threshold value 212. In this case, the aircraft control 200 may send an engagement datum to a command sensor that is the same as the previous engagement datum sent to the command sensor. As a non-limiting example, if the previous displacement of aircraft control 200 was less than first threshold value 212, and the displacement of aircraft control 200 is now more than first threshold value 212, but less than second threshold value 220, aircraft control 200 may send an engagement datum to a command sensor indicating that aircraft control 200 is disengaged. As a non-limiting example, if the previous displacement of aircraft control 200 was greater than second threshold value 220, and the displacement of aircraft control 200 is now less than second threshold value 220, but greater than first threshold value 212, aircraft control 200 may send an engagement datum to a command sensor indicating that aircraft control 200 is engaged.

Figure 3:
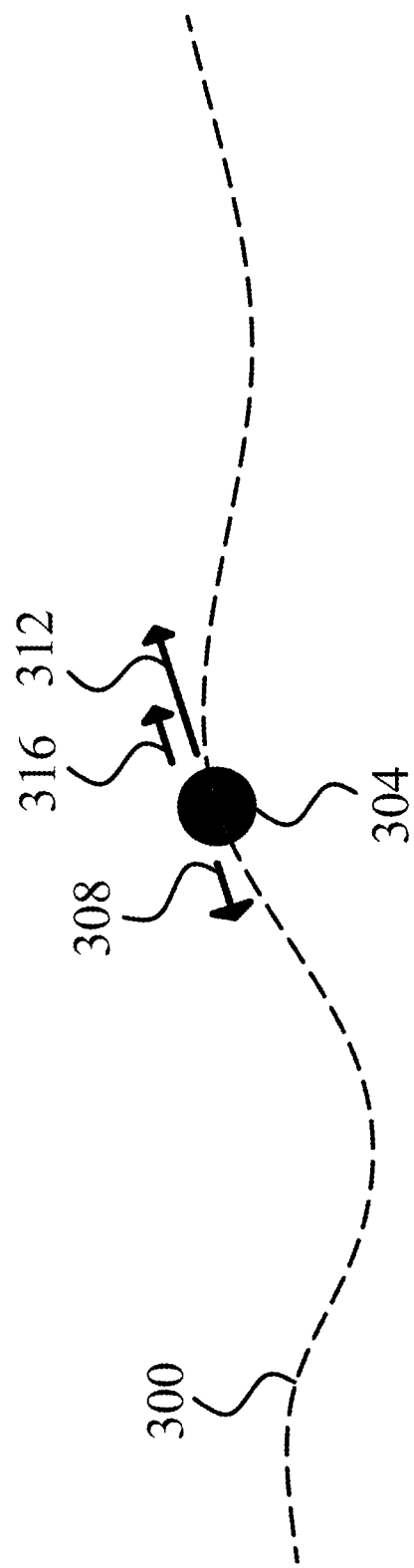
FIG. 3 is a diagram of an aircraft subject to drift that is parallel to its flight path.

Referring now to FIG. 3, an over-head view of an exemplary flight path 300 for aircraft 304 is depicted. In FIG. 3, drift 308 is parallel to the desired velocity 312. Drift 308 may be due to external factors, such as a crosswind or updraft, or internal factors, such as sensor noise. Desired velocity may be any input from the pilot of aircraft 304 that affects the position, direction, velocity, acceleration, and the like of aircraft 304. As depicted in FIG. 3, desired velocity 312 represents a desired velocity for aircraft 304. While desired velocity 312 may represent the pilot input velocity for aircraft 304, due to factors such as drift 308, the actual velocity of the aircraft may not match desired velocity 312. This is illustrated by a measured velocity 316. Measured velocity 316 is the actual velocity of aircraft 304 as measured by on-board sensors such as, as a non-limiting example, velocity sensor 128 in FIG. 1. A velocity supplemental attitude generator (e.g. velocity supplemental attitude generator 620 in FIG. 6) may produce a velocity supplemental attitude (VSA) (not shown). In this embodiment, drift 308 is parallel to desired velocity 312. This means that the drift 308 only slows down or speeds up the aircraft 304. The drift, in this embodiment, would not cause the aircraft to experience any lateral drift. As the aircraft is not experiencing any lateral drift, the VSA may be zero. The VSA may be calculated using:

$$VSA = K_d(f_p(\dot{x}_d(t) - \hat{\dot{x}}(t), \text{desired direction})) + K_i \int f_p(\dot{x}_d(t) - \hat{\dot{x}}_d(t), \text{desired direction}) \, dt$$

In the equation above, $K_d$ is derivative gain. $f_p$ is a projection function that take two inputs, the first input is perpendicular to the second input. $\dot{x}_d(t)$ is the desired velocity 312 as a function of time in the form of a desired velocity. $\hat{\dot{x}}_d(t)$ is the measured velocity 316 as a function of time. desired direction is the desired direction of aircraft 304; this can be obtained, as a non-limiting example, from the desired velocity 312. Finally, $K_i$ is integral gain. In this case, since drift 308 and desired velocity 312 are parallel to one another, $f_p$ will output a zero value. Thus, VSA will be equal to zero.

Figure 4:
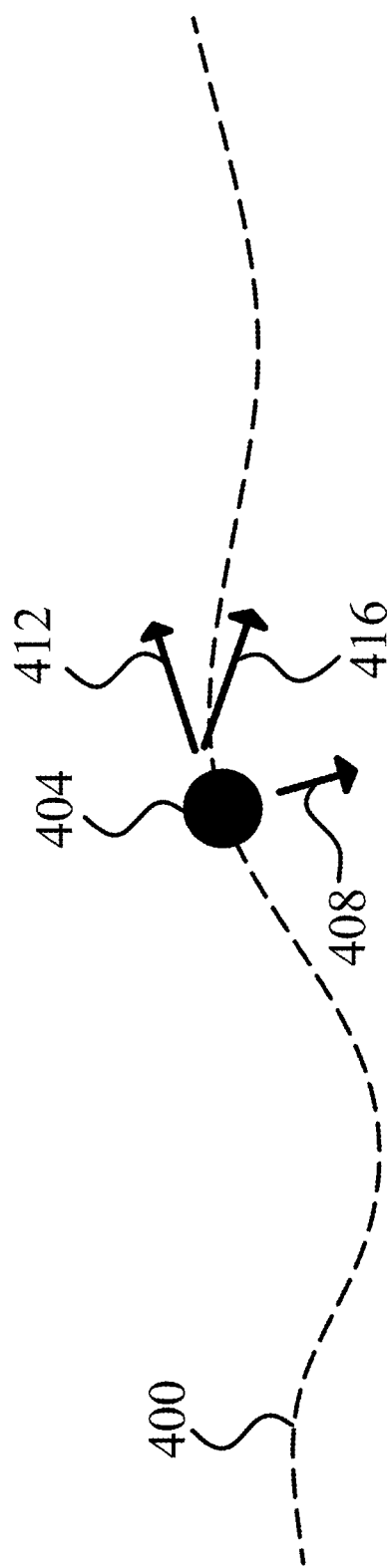
FIG. 4 is a diagram of an aircraft subject to drift that is perpendicular to its flight path.

Referring now to FIG. 4, another over-head view of an exemplary flight path 400 for aircraft 404 is depicted. In this embodiment, unlike in FIG. 3, drift 408 is perpendicular to the direction of motion, not parallel. Additionally, in this embodiment, drift 408 is perpendicular to desired velocity 412. Desired velocity may be any input from the pilot of aircraft 404 that affects the position, direction, velocity, acceleration, and the like of aircraft 404. This results in a measured velocity 416 that has elements that are both parallel to desired velocity 412 and perpendicular to desired velocity 412. Measured velocity 416 is the actual velocity of aircraft 404 as measured by on-board sensors such as, as a non-limiting example, velocity sensor 128 in FIG. 1. A velocity supplemental attitude generator (e.g. velocity supplemental attitude generator 620 in FIG. 6) may produce a VSA (not shown). In this embodiment, since drift 408 and desired velocity 412 are perpendicular, the aircraft 404 will experience lateral drift. As the aircraft 404., in this embodiment, will experience lateral drift, VSA will not be equal to zero. Returning to the equation for VSA laid out above, since drift 408 and desired velocity 412 are not parallel to one another, $f_p$ will be non-zero. Therefore, VSA may be non-zero. In this case, VSA and the aircraft attitude may be combined to obtain an aggregate attitude. Aircraft attitude, for the purposes of this disclosure, may include roll, pitch, yaw, any aircraft orientation measurement, aircraft velocity, aircraft speed, aircraft acceleration, and the like. As a non-limiting example, measured velocity 416 may be a component of the aircraft attitude.

Figure 5:
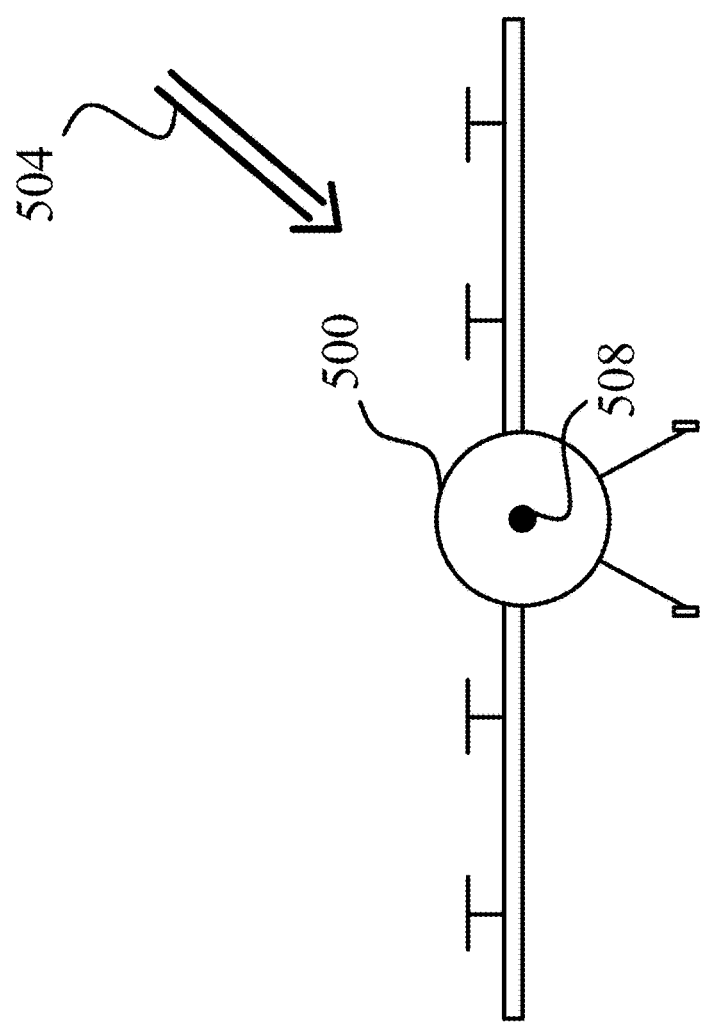
FIG. 5 is a head-on depiction of a hovering aircraft subject to drift.

Referring now to FIG. 5, an aircraft 500 is depicted. Aircraft 500 may be hovering. For the purposes of this disclosure, "hovering" means that an aircraft is maintaining substantially the same vertical position, while not substantially moving laterally. In FIG. 5, aircraft 500 may be subjected to drift 504. Drift 504, as a non-limiting example, may be due to wind. As another non-limiting example, drift 504 may be due to sensor noise. Aircraft 500 may have a hover position 508. Hover position is the position at which aircraft 500 is hovering. Hover position may be set by the pilot using an aircraft control. In some embodiments, drift 504 may cause aircraft 500 to deviate from hover position 508. In some embodiments, if aircraft 500 drifts too far away from hover position 508, aircraft may be configured to automatically land. In order to compensate for drift 504, a position supplemental attitude (PSA) may be used in order to keep aircraft 500 at hover position 508. PSA may be obtained using:

$$PSA = K_p(x_d(t) - \hat{x}_d(t)) + K_d(\dot{x}_d(t) - \hat{\dot{x}}_d(t)) + K_i \int (x_d(t) - \hat{x}_d(t)) \, dt$$

In the above equation, $K_p$ is a proportional gain. $x_d(t)$ is the pilot input position as a function of time. $\hat{x}_d(t)$ is the actual position of the aircraft as a function of time. $K_d$ is a derivative gain. $\dot{x}_d(t)$ is the desired velocity as a function of time. $\hat{\dot{x}}_d(t)$ is the measured velocity as a function of time. $K_i$ is an integral gain. As a non-limiting example, for the purposes of illustration, in the case where there is no drift, $x_d(t) = \hat{x}_d(t)$ and $\dot{x}_d(t) = \hat{\dot{x}}_d(t)$. This means that, applying the above equation for PSA, PSA will be equal to zero. This makes sense as, in the absence of drift, a PSA is not required.

Figure 6:
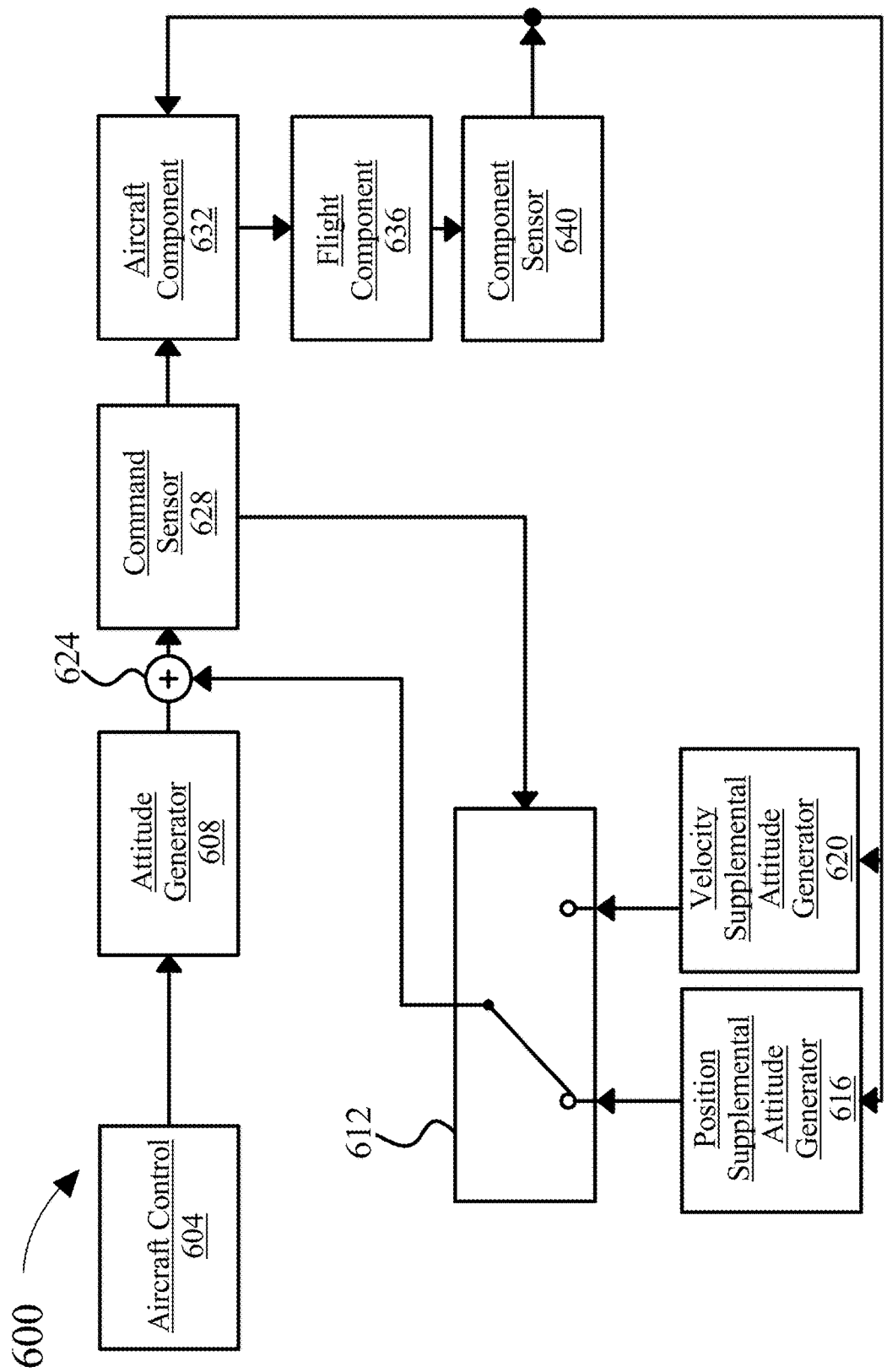
FIG. 6 is a diagram of a distributed supplemental attitude control system.

Referring now to FIG. 6, a diagram for a distributed supplemental attitude control system 600 is depicted. System 600 includes an aircraft control 604. Aircraft control 604 may include an input device such as a joystick, pedals, inceptor stick, or the like. In some embodiments, aircraft control 604 may be a spring-centered joystick. Aircraft control 604 may be consistent with some embodiments of aircraft control 112 in FIG. 1. Aircraft control 604 outputs a signal containing the pilot's inputs. As a non-limiting example, wherein aircraft control 604 is a joystick, aircraft control 604 may output a signal indicating the position of the joystick. In some embodiments, the signal from aircraft control 604 may be fed through a signal shaping component. The signal shaping component may shape the signal from aircraft control 604 according to a set of rules. As a non-limiting example, in some embodiments, signal shaping component may smooth out sudden changes in the aircraft control 604 signal.

With continued reference to FIG. 6, system 600 may include an attitude generator 608. Attitude generator 608 may receive a signal from aircraft control 604. In some embodiments, attitude generator 608 may receive a signal from a signal shaping component. Attitude generator 608 may take the signal that it receives and generate, as non-limiting examples, an input roll, an input pitch, an input yaw, angular velocity, angular acceleration, velocity, acceleration, and the like.

With continued reference to FIG. 6, system 600 includes a switch 612. Switch 612 choses whether system 600 uses the supplemental attitude from the position supplemental attitude generator 616 and velocity supplemental attitude generator 620. Switch 612 connects position supplemental attitude generator 616 to summation device 624 when aircraft control 604 is detected to be disengaged. Switch 612 connects velocity supplemental attitude generator 620 to summation device 624 when aircraft control 604 is detected to be engaged. As a non-limiting embodiment when aircraft control 604 is a joystick, for example, aircraft control 604 may be disengaged when the joystick is in its spring-centered position. Additionally, the joystick may be considered to be engaged when the joystick is displaced from the spring-centered position. In some embodiments, switch 612 may receive an engagement datum from a command sensor 628. Engagement datum may be calculated using any method discussed above with reference to FIG. 2.

With continued reference to FIG. 6, in some embodiments, switch 612 may not binarily switch between the velocity supplemental attitude output by velocity supplemental attitude generator 620 and the position supplemental attitude output by the position supplemental attitude generator. In some embodiments, instead, switch 612 may blend the velocity supplemental attitude output by velocity supplemental attitude generator 620 with the position supplemental attitude output by the position supplemental attitude generator. This embodiment may be used, in particular, when the engagement datum indicates that aircraft control has switched from engaged to disengaged. In this case, the supplemental attitude output by switch 612 to summation device 624 may initially be 100% the velocity supplemental attitude and may transition to being 100% the position supplemental attitude. As a non-limiting example, this transition may be linear. This transition may take place over a set transition time. As a non-limiting example, the transition time may be 1 second. As a non-limiting example, the transition time may be less than 1 second. As a non-limiting example, the transition time may be 10 seconds. As a non-limiting example, the transition time may be 5 seconds. As a non-limiting example, the transition may be parabolic. Another case in which the velocity and position supplemental attitudes may be blended is when the engagement datum indicates that aircraft control has switched from disengaged to engaged. In this case, the supplemental attitude output by switch 612 to summation device 624 may initially be 100% the position supplemental attitude and may transition to being 100% the velocity supplemental attitude. As a non-limiting example, this transition may be linear. This transition may take place over a set transition time. As a non-limiting example, the transition time may be 1 second. As a non-limiting example, the transition time may be less than 1 second. As a non-limiting example, the transition time may be 10 seconds. As a non-limiting example, the transition time may be 5 seconds. As a non-limiting example, the transition may be parabolic.

With continued reference to FIG. 6, system 600 includes a summation device 624. Summation device 624 may be configured to sum the aircraft attitude received from attitude generator 608 with the supplemental attitude received from switch 612. Depending on the state of switch 612, the supplemental attitude received from switch 612 may be a position supplemental attitude from position supplemental attitude generator 616 or it may be a velocity supplemental attitude from velocity supplemental attitude generator 620. Summation device 624 outputs an aggregate attitude to command sensor 628.

With continued reference to FIG. 6, aircraft component 632 may be consistent with any aircraft component disclosed as part of this disclosure. In particular, aircraft component 632 may be consistent with aircraft component 116 in FIG. 1. Aircraft component 632 receives the aggregate attitude from command sensor 628. Aircraft component 632 may output a command to flight component 636. Flight component 636 may be consistent with any flight component disclosed as part of this disclosure. In particular, flight component 636 may be consistent with flight component 108 in FIG. 1. The command may cause the aircraft to change states. As non-limiting examples, the aircraft's position, roll, pitch, yaw, velocity, acceleration . . . etc. may change. This state change may be detected by component sensor 640. Component sensor 640 may be any suitable sensor, such as a GPS, radar, lidar, accelerometer, gyroscope, compass, etc. Additionally, component sensor 640 may be an array of different sensors; the array may include different types of sensors. Component sensor 640 may be consistent with any sensor disclosed as part of this disclosure that would be suitable to detect a change in aircraft state.

With continued reference to FIG. 6, the attitude data detected by component sensor 640 may be fed back into aircraft component 632 as part of a feedback loop. This may allow aircraft component 632 to make adjustments to its commands. Velocity supplemental attitude generator 620 receives the velocity data detected by component sensor 640. Position supplemental attitude generator 616 receives both the position and velocity data detected by component sensor 640.

Figure 9:
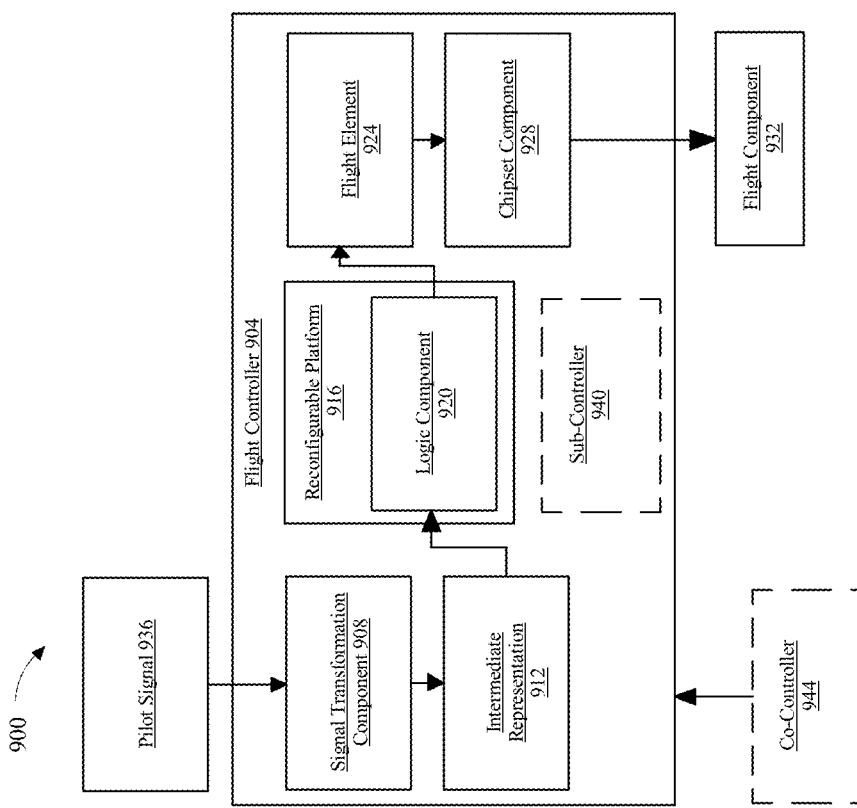
FIG. 9 is a block diagram of an exemplary embodiment of a flight controller.
Figure 11:
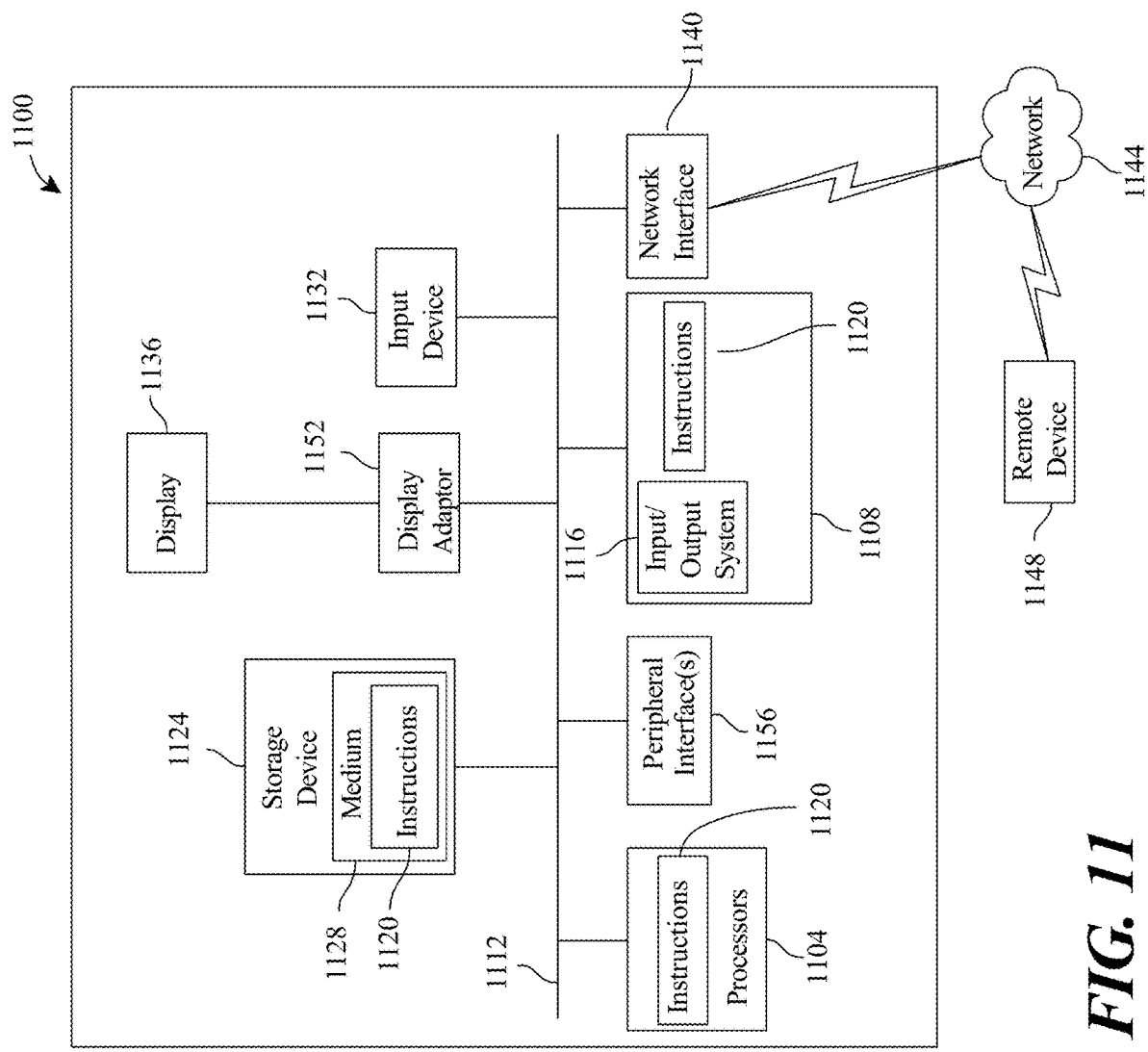
FIG. 11 is a block diagram of a computing system that can be used to implement any one or more of the methodologies disclosed herein and any one or more portions thereof. The drawings are not necessarily to scale and may be illustrated by phantom lines, diagrammatic representations and fragmentary views. In certain instances, details that are not necessary for an understanding of the embodiments or that render other details difficult to perceive may have been omitted.

With continued reference to FIG. 6, velocity supplemental attitude generator 620 and position supplemental attitude generator 616 may be computing devices, such as computer system 1100 in FIG. 11 or flight controller 904 in FIG. 9. Velocity supplemental attitude generator 620 may carry out the processes described in FIGS. 3 and 4 and the paragraphs pertaining to FIGS. 3 and 4. Position supplemental attitude generator 616 may carry out the processes described in FIG. 5 and the paragraphs pertaining to FIG. 5.

Figure 7:
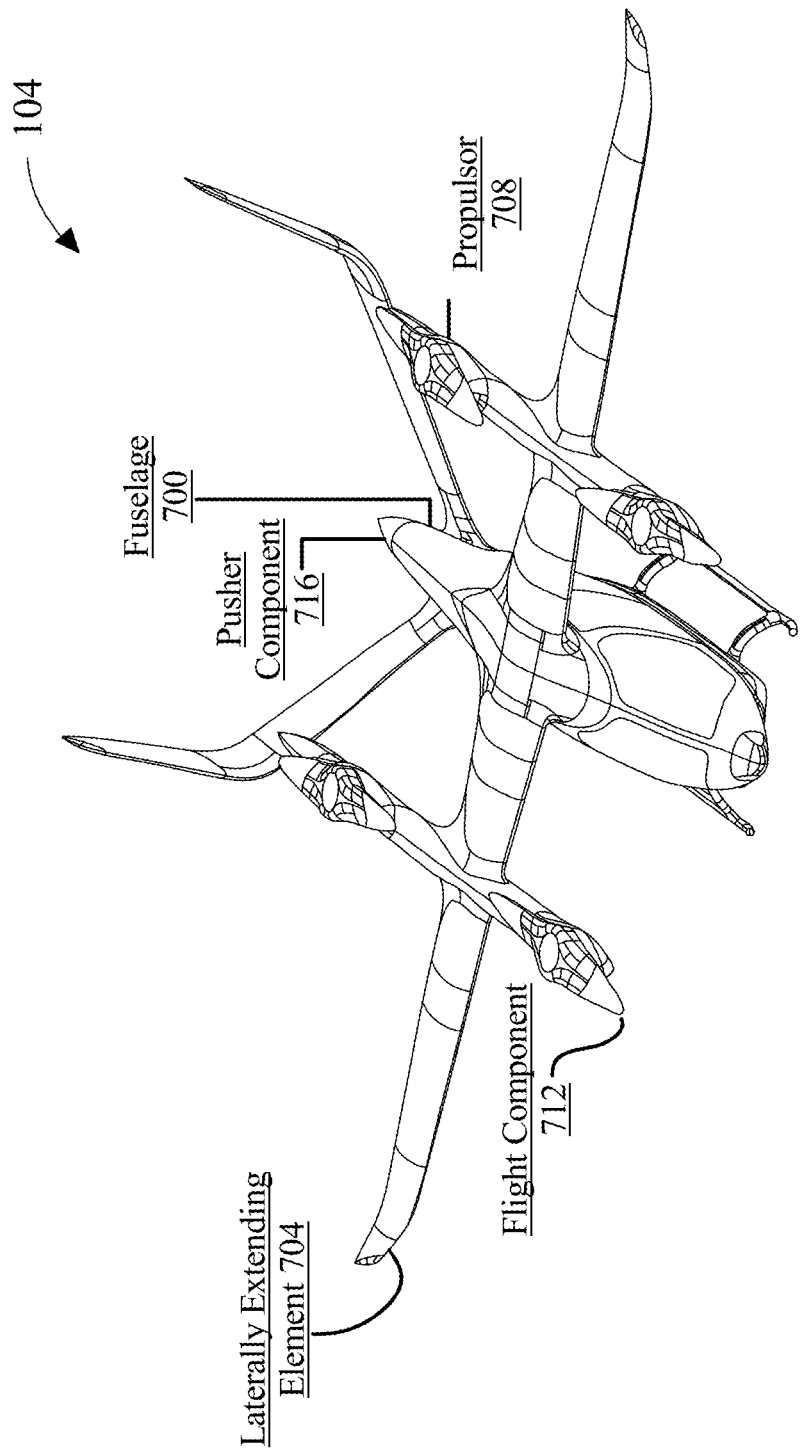
FIG. 7 is a diagrammatic representation of an exemplary embodiment of an aircraft.

Now referring to FIG. 7, an exemplary embodiment of aircraft 104 is illustrated. In an embodiment, and without limitation, aircraft 104 may include a fuselage 700. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 700 may comprise structural elements that physically support the shape and structure of an aircraft. Structural elements may take a plurality of forms, alone or in combination with other types. Structural elements may vary depending on the construction type of aircraft and specifically, the fuselage. Fuselage 700 may comprise a truss structure. A truss structure is often used with a lightweight aircraft and comprises welded steel tube trusses. A truss, as used herein, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later in this paper.

Still referring to FIG. 7, fuselage 700 may comprise geodesic construction. Geodesic structural elements may include stringers wound about formers (which may be alternatively called station frames) in opposing spiral directions. A stringer, as used herein, is a general structural element that comprises a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along the length of the interior of fuselage 700 orthogonal to the longitudinal (nose to tail) axis of the aircraft and forms the general shape of fuselage 700. A former may comprise differing cross-sectional shapes at differing locations along fuselage 700, as the former is the structural element that informs the overall shape of a fuselage 700 curvature. In embodiments, aircraft skin can be anchored to formers and strings such that the outer mold line of the volume encapsulated by the formers and stringers comprises the same shape as aircraft 104 when installed. In other words, former(s) may form a fuselage's ribs, and the stringers may form the interstitials between such ribs. The spiral orientation of stringers about formers provides uniform robustness at any point on an aircraft fuselage such that if a portion sustains damage, another portion may remain largely unaffected. Aircraft skin would be mechanically coupled to underlying stringers and formers and may interact with a fluid, such as air, to generate lift and perform maneuvers.

In an embodiment, and still referring to FIG. 7, fuselage 700 may comprise monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

Still referring to FIG. 7, fuselage 700 can include a semi-monocoque construction. Semi-monocoque construction, as used herein, is a partial monocoque construction, wherein a monocoque construction is describe above detail. In semi-monocoque construction, fuselage 700 may derive some structural support from stressed aircraft skin and some structural support from underlying frame structure made of structural elements. Formers or station frames can be seen running transverse to the long axis of fuselage 700 with circular cutouts which are generally used in real-world manufacturing for weight savings and for the routing of electrical harnesses and other modern on-board systems. In a semi-monocoque construction, stringers are the thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate that there are numerous methods for mechanical fastening of the aforementioned components like crews, nails, dowels, pins, anchors, adhesives like glue or epoxy, or bolts and nuts, to name a few. A subset of fuselage under the umbrella of semi-monocoque construction is unibody vehicles. Unibody, which is short for "unitized body" or alternatively "unitary construction", vehicles are characterized by a construction in which the body, floor plan, and chassis form a single structure. In the aircraft world, unibody would comprise the internal structural elements like formers and stringers are constructed in one piece, integral to the aircraft skin as well as any floor construction like a deck.

Still referring to FIG. 7, stringers and formers which account for the bulk of any aircraft structure excluding monocoque construction can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. The location of said stringers greatly informs the type of forces and loads applied to each and every stringer, all of which may be handled by material selection, cross-sectional area, and mechanical coupling methods of each member. The same assessment may be made for formers. In general, formers are significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In an embodiment, and still referring to FIG. 7, stressed skin, when used in semi-monocoque construction is the concept where the skin of an aircraft bears partial, yet significant, load in the overall structural hierarchy. In other words, the internal structure, whether it be a frame of welded tubes, formers and stringers, or some combination, is not sufficiently strong enough by design to bear all loads. The concept of stressed skin is applied in monocoque and semi-monocoque construction methods of fuselage 700. Monocoque comprises only structural skin, and in that sense, aircraft skin undergoes stress by applied aerodynamic fluids imparted by the fluid. Stress as used in continuum mechanics can be described in pound-force per square inch (lbf/in$^2$) or Pascals (Pa). In semi-monocoque construction stressed skin bears part of the aerodynamic loads and additionally imparts force on the underlying structure of stringers and formers.

Still referring to FIG. 7, aircraft 104 may include a plurality of laterally extending elements 704 attached to fuselage 700. As used in this disclosure a "laterally extending element" is an element that projects essentially horizontally from fuselage, including an outrigger, a spar, and/or a fixed wing that extends from fuselage 700. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section geometry may comprise an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. Laterally extending element 704 may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Laterally extending element 704 may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground.

Still referring to FIG. 7, aircraft 104 may include at least a propulsor 708. As used in this disclosure a "propulsor" is a component and/or device used to propel a craft by exerting force on a fluid medium, which may include a gaseous medium such as air or a liquid medium such as water. In an embodiment, when a propulsor twists and pulls air behind it, it will, at the same time, push an aircraft forward with an equal amount of force and/or thrust. The more air pulled behind an aircraft, the greater the thrust with which the aircraft is pushed forward. Propulsor 708 may include any device or component that consumes electrical power on demand to propel an electric aircraft in a direction or other vehicle while on ground or in-flight. In an embodiment, propulsor 708 may include a puller component. As used in this disclosure a "puller component" is a component that pulls and/or tows an aircraft through a medium. As a non-limiting example, puller component may include a flight component 712 such as a puller propeller, a puller motor, a puller propulsor, and the like. Additionally, or alternatively, puller component may include a plurality of puller flight components. In another embodiment, aircraft 104 may include a pusher component 716. As used in this disclosure a "pusher component" is a component that pushes and/or thrusts an aircraft through a medium. As a non-limiting example, pusher component 716 may include a pusher component such as a pusher propeller, a pusher motor, a pusher propulsor, and the like. Additionally, or alternatively, pusher component 716 may include a plurality of pusher components.

Figure 8:
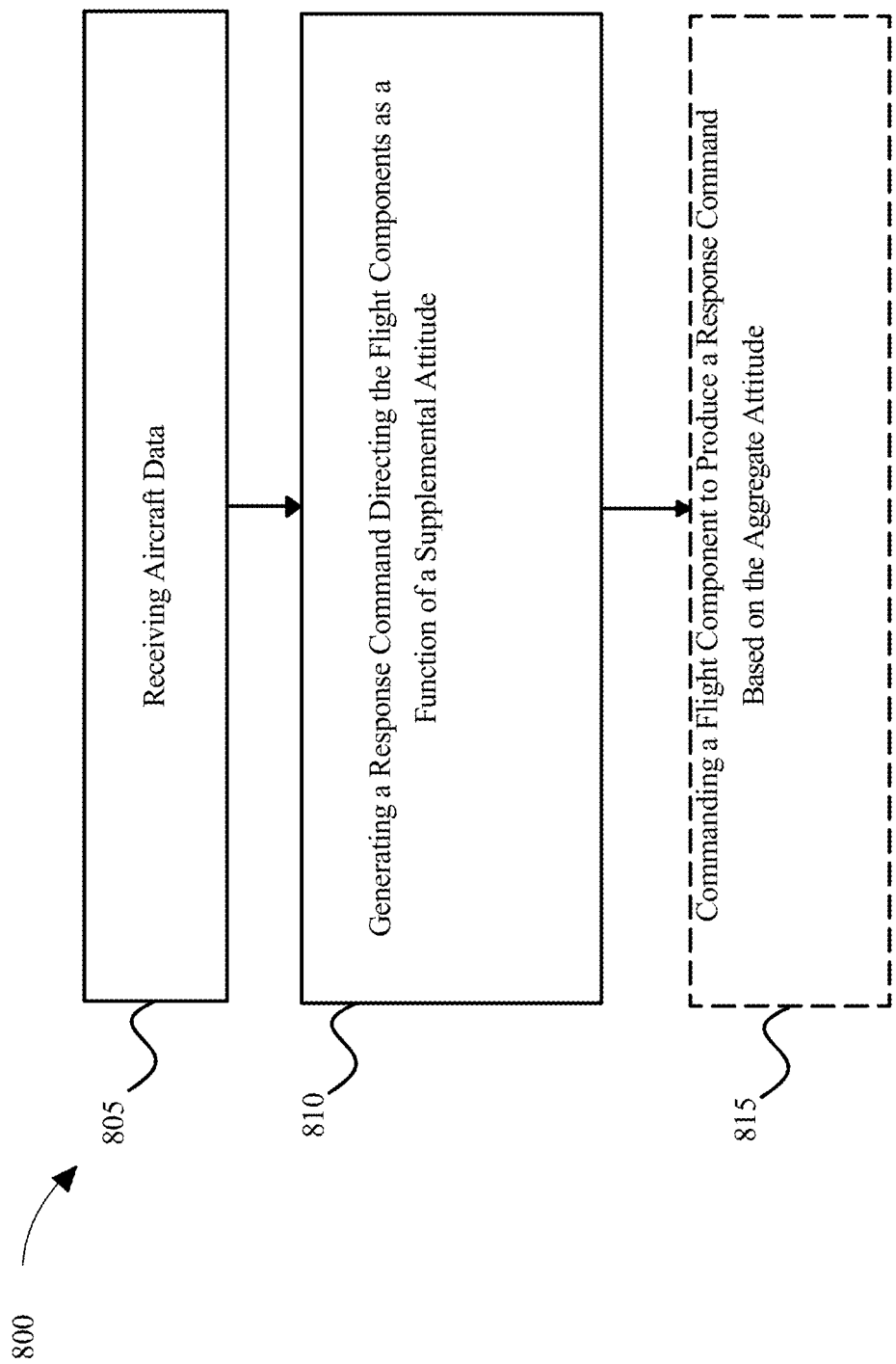
FIG. 8 is a flow chart of a method distributed control with supplemental attitude adjustment.

Referring now to FIG. 8, a flow chart of an embodiment of a method of distributed control with supplemental attitude adjustment 800 is shown. Method 800 includes a step 805 of receiving aircraft data. Step 805 includes a step of receiving, from a command sensor attached to an aircraft control, an aircraft command. Command sensor may be consistent with any command sensor disclosed in this disclosure. Aircraft control may be consistent with any aircraft control disclosed in this disclosure. Aircraft command is a command that instructs a flight component to perform an action or motion, such as, as non-limiting examples, increasing thrust or changing the angle of a control surface. Aircraft command may be consistent with any aircraft command disclosed as part of this disclosure.

With continued reference to FIG. 8, method 800 further includes a step 810 of generating a supplemental attitude. Step 810 includes a step of generating a response command directing the flight components as a function of a supplemental attitude. Response command may be consistent with any response command discloses as part of this disclosure. This step includes generating a supplemental attitude as a function of an engagement datum. Engagement datum may be consistent with any engagement datum disclosed in this disclosure. Generating a supplemental attitude including, choosing a position supplemental attitude if the engagement datum indicates that the aircraft control is disengaged and choosing a velocity supplemental attitude if the engagement datum indicates that the aircraft control is engaged. The portion of this step concerning choosing the position supplemental attitude and choosing the velocity supplemental attitude may be implemented, for example, using switch 612 in FIG. 6. Position supplemental attitude may be consistent with any position supplemental attitude disclosed in this disclosure. Velocity supplemental attitude may be consistent with any velocity supplemental attitude disclosed as part of this disclosure. Additionally, step 810 includes a step of calculating an aggregate attitude, wherein calculating the aggregate attitude comprises combining the aircraft attitude with the supplemental attitude to obtain an aggregate attitude. The supplemental attitude can be either, position supplemental attitude or velocity supplemental attitude, depending on which has been chosen as described above. Aggregate attitude may be consistent with any aggregate attitude disclosed as part of this disclosure. Step 810 furthermore includes a step of generating the response command as a function of an aggregate attitude.

With continued reference to FIG. 8, method 800 may include an optional step 815 of commanding a flight component of a plurality of flight components to produce a response command based on the aggregate attitude, wherein the flight component of the plurality of flight components is attached to an aircraft component of a plurality of aircraft components. The flight component may be, as non-limiting examples, a motor, an engine, a rotor, a control surface, and the like. The flight component may be consistent with any flight component disclosed as part of this disclosure With continued reference to FIG. 8, step 805 may further include a step of receiving a desired velocity, the desired velocity including a desired direction of movement. Desired velocity may be consistent with any desired velocity disclosed in this disclosure. The desired direction of movement may be a component of the desired velocity. step 805 may further include a step of receiving an actual velocity from a velocity sensor. Actual velocity may be consistent with any actual velocity disclosed as part of this disclosure. Velocity sensor may be consistent with any velocity sensor disclosed as part of this disclosure. Step 810 may further include a step of generating a velocity supplemental attitude. Velocity supplemental attitude may be consistent with any velocity supplemental attitude disclosed in this disclosure. This step may be carried out by, as a non-limiting example, velocity supplemental attitude generator 620 in FIG. 6. The step of generating a velocity supplemental attitude may further include a step of calculating a difference between the desired velocity and the actual velocity. Additionally, the step of generating a velocity supplemental attitude may further include a step of calculating the part of the difference that is perpendicular to the desired direction of movement.

With continued reference to FIG. 8, method 800 may further include a step of generating the engagement datum. The step of generating the engagement datum may include a step of calculating the displacement of the aircraft control from a spring-centered position. The default position may be consistent with any default position disclosed in this disclosure. The step of generating the engagement datum also may include a step of comparing the displacement of the aircraft control against a first threshold. First threshold may be consistent with any first threshold disclosed in this disclosure. The step of generating the engagement datum also may include a step of transmitting an engagement datum to the command sensor indicating that the aircraft control is engaged if the displacement of the aircraft control exceeds the first threshold. The engagement datum may, as a non-limiting example, be a binary value. For example, if aircraft control is disengaged, engagement datum may be "0." If aircraft control is engaged, engagement datum may be "1."

With continued reference to FIG. 8, the step of generating the engagement datum may further include a step of comparing the displacement of the aircraft control against a second threshold, wherein the second threshold is less than the first threshold. Second threshold may be consistent with any second threshold disclosed in the disclosure. Additionally, the step of generating the engagement datum may further include a step of transmitting an engagement datum to the command sensor indicating that the aircraft control is disengaged if the displacement of the aircraft control does not exceed the second threshold. The first threshold and second threshold, in some embodiments, may be consistent with the first threshold and second threshold, respectively, depicted in FIG. 2. In some embodiments of method 800, aircraft control may be a joystick. Joystick may be consistent with any joystick described as part of this disclosure.

With continued reference to FIG. 8, step 810 may further include, as part of generating the supplemental attitude, a step of transitioning from choosing a position supplemental attitude to choosing a velocity supplemental attitude when the engagement datum indicates that the aircraft control has switched from disengaged to engaged. As a non-limiting example, the engagement datum may indicate that the aircraft control has switched from disengaged to engaged by switching from "0" to "1." In some embodiments, step 810 may further include a step of transitioning from choosing a velocity supplemental attitude to choosing a position supplemental attitude when the engagement datum indicates that the aircraft control has switched from engaged to disengaged. As a non-limiting example, the engagement datum may indicate that the aircraft control has switched from engaged to disengaged by switching from "1" to "0."

With continued reference to FIG. 8, step 815 may further include a step of receiving an alternate signal from an second aircraft component of the at least an aircraft component. Alternate signal may be consistent with any alternate signal disclosed as part of this disclosure. Second aircraft component may be consistent with any second aircraft component disclosed as part of this disclosure. Step 815 may also further include a step of commanding the flight component of the plurality of flight components as a function of the alternate signal. In some embodiments, step 815 may further include a step of transmitting an outgoing signal to the second aircraft component, wherein the outgoing signal contains the aggregate attitude. In some embodiments, method 800 may further include a step of converting the aircraft command to a digital electronic signal. Digital electronic signal may be consistent with any digital electronic signal disclosed as part of this disclosure.

Now referring to FIG. 9, an exemplary embodiment 900 of a flight controller 904 is illustrated. As used in this disclosure a "flight controller" is a computing device of a plurality of computing devices dedicated to data storage, security, distribution of traffic for load balancing, and flight instruction. Flight controller 904 may include and/or communicate with any computing device as described in this disclosure, including without limitation a microcontroller, microprocessor, digital signal processor (DSP) and/or system on a chip (SoC) as described in this disclosure. Further, flight controller 904 may include a single computing device operating independently, or may include two or more computing device operating in concert, in parallel, sequentially or the like; two or more computing devices may be included together in a single computing device or in two or more computing devices. In embodiments, flight controller 904 may be installed in an aircraft, may control the aircraft remotely, and/or may include an element installed in the aircraft and a remote element in communication therewith.

In an embodiment, and still referring to FIG. 9, flight controller 904 may include a signal transformation component 908. As used in this disclosure a "signal transformation component" is a component that transforms and/or converts a first signal to a second signal, wherein a signal may include one or more digital and/or analog signals. For example, and without limitation, signal transformation component 908 may be configured to perform one or more operations such as preprocessing, lexical analysis, parsing, semantic analysis, and the like thereof. In an embodiment, and without limitation, signal transformation component 908 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 908 may include transforming one or more low-level languages such as, but not limited to, machine languages and/or assembly languages. For example, and without limitation, signal transformation component 908 may include transforming a binary language signal to an assembly language signal. In an embodiment, and without limitation, signal transformation component 908 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof Still referring to FIG. 9, signal transformation component 908 may be configured to optimize an intermediate representation 912. As used in this disclosure an "intermediate representation" is a data structure and/or code that represents the input signal. Signal transformation component 908 may optimize intermediate representation as a function of a data-flow analysis, dependence analysis, alias analysis, pointer analysis, escape analysis, and the like thereof. In an embodiment, and without limitation, signal transformation component 908 may optimize intermediate representation 912 as a function of one or more inline expansions, dead code eliminations, constant propagation, loop transformations, and/or automatic parallelization functions. In another embodiment, signal transformation component 908 may optimize intermediate representation as a function of a machine dependent optimization such as a peephole optimization, wherein a peephole optimization may rewrite short sequences of code into more efficient sequences of code. Signal transformation component 908 may optimize intermediate representation to generate an output language, wherein an "output language," as used herein, is the native machine language of flight controller 904. For example, and without limitation, native machine language may include one or more binary and/or numerical languages.

In an embodiment, and without limitation, signal transformation component 908 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 9, flight controller 904 may include a reconfigurable hardware platform 916. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 916 may be reconfigured to enact any algorithm and/or algorithm selection process received from another computing device and/or created using machine-learning processes.

Still referring to FIG. 9, reconfigurable hardware platform 916 may include a logic component 920. As used in this disclosure a "logic component" is a component that executes instructions on output language. For example, and without limitation, logic component may perform basic arithmetic, logic, controlling, input/output operations, and the like thereof. Logic component 920 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 920 may be organized according to Von Neumann and/or Harvard architecture as a non-limiting example. Logic component 920 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 920 may include one or more integrated circuit microprocessors, which may contain one or more central processing units, central processors, and/or main processors, on a single metal-oxide-semiconductor chip. Logic component 920 may be configured to execute a sequence of stored instructions to be performed on the output language and/or intermediate representation 912. Logic component 920 may be configured to fetch and/or retrieve the instruction from a memory cache, wherein a "memory cache," as used in this disclosure, is a stored instruction set on flight controller 904. Logic component 920 may be configured to decode the instruction retrieved from the memory cache to opcodes and/or operands. Logic component 920 may be configured to execute the instruction on intermediate representation 912 and/or output language. For example, and without limitation, logic component 920 may be configured to execute an addition operation on intermediate representation 912 and/or output language.

In an embodiment, and without limitation, logic component 920 may be configured to calculate a flight element 924. As used in this disclosure a "flight element" is an element of datum denoting a relative status of aircraft. For example, and without limitation, flight element 924 may denote one or more torques, thrusts, airspeed velocities, forces, altitudes, groundspeed velocities, directions during flight, directions facing, forces, orientations, and the like thereof. For example, and without limitation, flight element 924 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 924 may denote that aircraft is following a flight path accurately and/or sufficiently.

Still referring to FIG. 9, flight controller 904 may include a chipset component 928. As used in this disclosure a "chipset component" is a component that manages data flow. In an embodiment, and without limitation, chipset component 928 may include a northbridge data flow path, wherein the northbridge dataflow path may manage data flow from logic component 920 to a high-speed device and/or component, such as a RAM, graphics controller, and the like thereof. In another embodiment, and without limitation, chipset component 928 may include a southbridge data flow path, wherein the southbridge dataflow path may manage data flow from logic component 920 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 928 may manage data flow between logic component 920, memory cache, and a flight component 932. As used in this disclosure a "flight component" is a portion of an aircraft that can be moved or adjusted to affect one or more flight elements. For example, flight component 932 may include a component used to affect the aircrafts' roll and pitch which may comprise one or more ailerons. As a further example, flight component 932 may include a rudder to control yaw of an aircraft. In an embodiment, chipset component 928 may be configured to communicate with a plurality of flight components as a function of flight element 924. For example, and without limitation, chipset component 928 may transmit to an aircraft rotor to reduce torque of a first lift propulsor and increase the forward thrust produced by a pusher component to perform a flight maneuver.

In an embodiment, and still referring to FIG. 9, flight controller 904 may be configured generate an autonomous function. As used in this disclosure an "autonomous function" is a mode and/or function of flight controller 904 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 924. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 904 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 904 will control the ailerons and/or rudders. As used in this disclosure "non-autonomous mode" is a mode that denotes a pilot will control aircraft and/or maneuvers of aircraft in its entirety.

In an embodiment, and still referring to FIG. 9, flight controller 904 may generate autonomous function as a function of an autonomous machine-learning model. As used in this disclosure an "autonomous machine-learning model" is a machine-learning model to produce an autonomous function output given flight element 924 and a pilot signal 936 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 936 may denote that a pilot is controlling and/or maneuvering ailerons, wherein the pilot is not in control of the rudders and/or propulsors. In an embodiment, pilot signal 936 may include an implicit signal and/or an explicit signal. For example, and without limitation, pilot signal 936 may include an explicit signal, wherein the pilot explicitly states there is a lack of control and/or desire for autonomous function. As a further non-limiting example, pilot signal 936 may include an explicit signal directing flight controller 904 to control and/or maintain a portion of aircraft, a portion of the flight plan, the entire aircraft, and/or the entire flight plan. As a further non-limiting example, pilot signal 936 may include an implicit signal, wherein flight controller 904 detects a lack of control such as by a malfunction, torque alteration, flight path deviation, and the like thereof. In an embodiment, and without limitation, pilot signal 936 may include one or more explicit signals to reduce torque, and/or one or more implicit signals that torque may be reduced due to reduction of airspeed velocity. In an embodiment, and without limitation, pilot signal 936 may include one or more local and/or global signals. For example, and without limitation, pilot signal 936 may include a local signal that is transmitted by a pilot and/or crew member. As a further non-limiting example, pilot signal 936 may include a global signal that is transmitted by air traffic control and/or one or more remote users that are in communication with the pilot of aircraft. In an embodiment, pilot signal 936 may be received as a function of a tri-state bus and/or multiplexor that denotes an explicit pilot signal should be transmitted prior to any implicit or global pilot signal.

Still referring to FIG. 9, autonomous machine-learning model may include one or more autonomous machine-learning processes such as supervised, unsupervised, or reinforcement machine-learning processes that flight controller 904 and/or a remote device may or may not use in the generation of autonomous function. As used in this disclosure "remote device" is an external device to flight controller 904. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naive bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 9, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 904 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 9, flight controller 904 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 904. Remote device and/or FPGA may transmit a signal, bit, datum, or parameter to flight controller 904 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 904 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 9, flight controller 904 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 9, flight controller 904 may include, but is not limited to, for example, a cluster of flight controllers in a first location and a second flight controller or cluster of flight controllers in a second location. Flight controller 904 may include one or more flight controllers dedicated to data storage, security, distribution of traffic for load balancing, and the like. Flight controller 904 may be configured to distribute one or more computing tasks as described below across a plurality of flight controllers, which may operate in parallel, in series, redundantly, or in any other manner used for distribution of tasks or memory between computing devices. For example, and without limitation, flight controller 904 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 9, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 932. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 9, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 904. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 912 and/or output language from logic component 920, wherein output language may include one or more analog-to-digital conversions, low bit rate transmissions, message encryptions, digital signals, binary signals, logic signals, analog signals, and the like thereof described above in detail.

Still referring to FIG. 9, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 9, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 9, flight controller 904 may also be implemented using a "shared nothing" architecture in which data is cached at the worker, in an embodiment, this may enable scalability of aircraft and/or computing device. Flight controller 904 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 9, a node may include, without limitation a plurality of inputs xi that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 9, flight controller may include a sub-controller 940. As used in this disclosure a "sub-controller" is a controller and/or component that is part of a distributed controller as described above; for instance, flight controller 904 may be and/or include a distributed flight controller made up of one or more sub-controllers. For example, and without limitation, sub-controller 940 may include any controllers and/or components thereof that are similar to distributed flight controller and/or flight controller as described above. Sub-controller 940 may include any component of any flight controller as described above. Sub-controller 940 may be implemented in any manner suitable for implementation of a flight controller as described above. As a further non-limiting example, sub-controller 940 may include one or more processors, logic components and/or computing devices capable of receiving, processing, and/or transmitting data across the distributed flight controller as described above. As a further non-limiting example, sub-controller 940 may include a controller that receives a signal from a first flight controller and/or first distributed flight controller component and transmits the signal to a plurality of additional sub-controllers and/or flight components.

Still referring to FIG. 9, flight controller may include a co-controller 944. As used in this disclosure a "co-controller" is a controller and/or component that joins flight controller 904 as components and/or nodes of a distributer flight controller as described above. For example, and without limitation, co-controller 944 may include one or more controllers and/or components that are similar to flight controller 904. As a further non-limiting example, co-controller 944 may include any controller and/or component that joins flight controller 904 to distributer flight controller. As a further non-limiting example, co-controller 944 may include one or more processors, logic components and/or computing devices capable of receiving, processing, and/or transmitting data to and/or from flight controller 904 to distributed flight control system. Co-controller 944 may include any component of any flight controller as described above. Co-controller 944 may be implemented in any manner suitable for implementation of a flight controller as described above.

In an embodiment, and with continued reference to FIG. 9, flight controller 904 may be designed and/or configured to perform any method, method step, or sequence of method steps in any embodiment described in this disclosure, in any order and with any degree of repetition. For instance, flight controller 904 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 10:
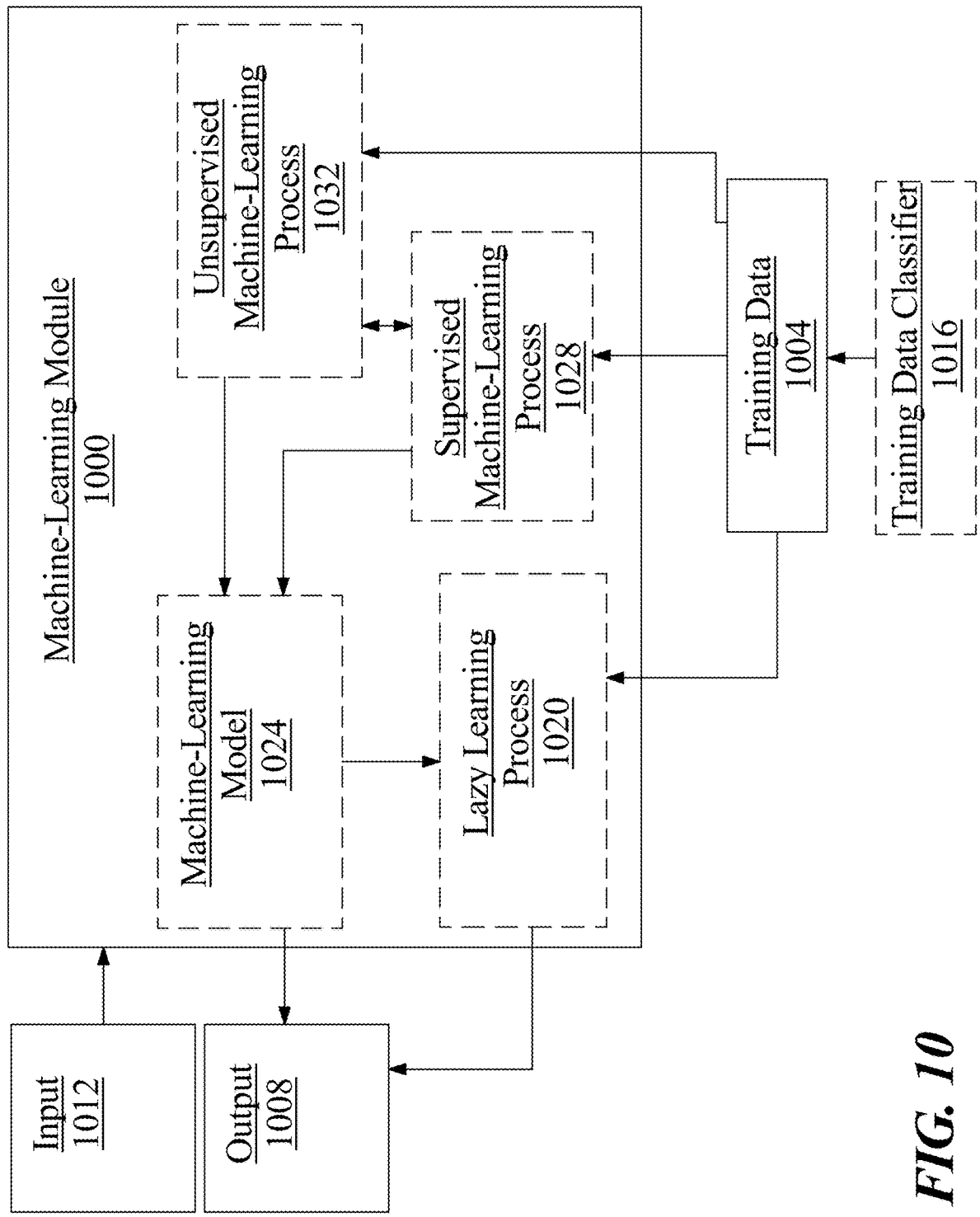
FIG. 10 is a block diagram of an exemplary embodiment of a machine-learning module.

Referring now to FIG. 10, an exemplary embodiment of a machine-learning module 1000 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1004 to generate an algorithm that will be performed by a computing device/module to produce outputs 1008 given data provided as inputs 1012; this is in contrast to a non-machine learning software program where the commands to be executed are determined in advance by a user and written in a programming language.

Still referring to FIG. 10, "training data," as used herein, is data containing correlations that a machine-learning process may use to model relationships between two or more categories of data elements. For instance, and without limitation, training data 1004 may include a plurality of data entries, each entry representing a set of data elements that were recorded, received, and/or generated together; data elements may be correlated by shared existence in a given data entry, by proximity in a given data entry, or the like. Multiple data entries in training data 1004 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1004 according to various correlations; correlations may indicate causative and/or predictive links between categories of data elements, which may be modeled as relationships such as mathematical relationships by machine-learning processes as described in further detail below. Training data 1004 may be formatted and/or organized by categories of data elements, for instance by associating data elements with one or more descriptors corresponding to categories of data elements. As a non-limiting example, training data 1004 may include data entered in standardized forms by persons or processes, such that entry of a given data element in a given field in a form may be mapped to one or more descriptors of categories. Elements in training data 1004 may be linked to descriptors of categories by tags, tokens, or other data elements; for instance, and without limitation, training data 1004 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 10, training data 1004 may include one or more elements that are not categorized; that is, training data 1004 may not be formatted or contain descriptors for some elements of data. Machine-learning algorithms and/or other processes may sort training data 1004 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1004 to be made applicable for two or more distinct machine-learning algorithms as described in further detail below. Training data 1004 used by machine-learning module 1000 may correlate any input data as described in this disclosure to any output data as described in this disclosure. As a non-limiting illustrative example flight elements and/or pilot signals may be inputs, wherein an output may be an autonomous function.

Further referring to FIG. 10, training data may be filtered, sorted, and/or selected using one or more supervised and/or unsupervised machine-learning processes and/or models as described in further detail below; such models may include without limitation a training data classifier 1016. Training data classifier 1016 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1000 may generate a classifier using a classification algorithm, defined as a processes whereby a computing device and/or any module and/or component operating thereon derives a classifier from training data 1004. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 10, machine-learning module 1000 may be configured to perform a lazy-learning process 1020 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1004. Heuristic may include selecting some number of highest-ranking associations and/or training data 1004 elements. Lazy learning may implement any suitable lazy learning algorithm, including without limitation a K-nearest neighbors algorithm, a lazy naive Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 10, machine-learning processes as described in this disclosure may be used to generate machine-learning models 1024. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 1024 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1024 may be generated by creating an artificial neural network, such as a convolutional neural network comprising an input layer of nodes, one or more intermediate layers, and an output layer of nodes. Connections between nodes may be created via the process of "training" the network, in which elements from a training data 1004 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 10, machine-learning algorithms may include at least a supervised machine-learning process 1028. At least a supervised machine-learning process 1028, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1004. Persons skilled in the art, upon reviewing the entirety of this disclosure, will be aware of various possible variations of at least a supervised machine-learning process 1028 that may be used to determine relation between inputs and outputs. Supervised machine-learning processes may include classification algorithms as defined above.

Further referring to FIG. 10, machine learning processes may include at least an unsupervised machine-learning processes 1032. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 10, machine-learning module 1000 may be designed and configured to create a machine-learning model 1024 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 10, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A distributed control system with supplemental attitude adjustment, the system comprising:
    an aircraft control, the aircraft control located within an aircraft having an aircraft attitude;
    a plurality of flight components;
    a plurality of aircraft components communicatively connected to the plurality of flight components, wherein each aircraft component of the plurality of aircraft components is configured to:
        receive, from a command sensor attached to the aircraft control, an aircraft command; and
        generate a response command directing the flight components as a function of an aggregate attitude, wherein the aggregate attitude combines a supplemental attitude with the aircraft attitude.

2. The system of claim 1, further comprising an aircraft control component, the aircraft control component communicatively connected to the aircraft control, the aircraft control component configured to:
    calculate the displacement of the aircraft control from a default position;
    compare the displacement of the aircraft control against a first threshold; and transmit an engagement datum to the command sensor indicating that the aircraft control is engaged if the displacement of the aircraft control exceeds the first threshold.

3. The system of claim 2, wherein the aircraft control component is further configured to:
compare the displacement of the aircraft control against a second threshold, wherein the second threshold is less than the first threshold; and
transmit an engagement datum to the command sensor indicating that the aircraft control is disengaged if the displacement of the aircraft control does not exceed the second threshold.

4. The system of claim 1, wherein each aircraft component of the plurality of aircraft components is configured to generate the supplemental attitude as a function of an engagement datum.

5. The system of claim 4, wherein generating the supplemental attitude further comprises:
determining that the aircraft control is disengaged; and
choosing a position supplemental attitude as a function of the determination.

6. The system of claim 4, wherein generating the supplemental attitude further comprises:
determining that the aircraft control is engaged; and
choosing a velocity supplemental attitude as a function of the determination.

7. The system of claim 6, wherein each of the plurality of aircraft components is further configured to determine the velocity supplemental attitude by:
receiving a desired velocity, the desired velocity including a desired direction of movement;
receiving an actual velocity from a velocity sensor; and
generating a velocity supplemental attitude, comprising:
calculating the difference between the desired velocity and the actual velocity; and
calculating the part of the difference that is perpendicular to the desired direction of movement.

8. The system of claim 1, wherein the plurality of aircraft components comprises a first aircraft component and a second aircraft component, the first aircraft component is further configured to:
receive an alternate signal from the second aircraft component; and
command the flight component as a function of the alternate signal.

9. The system of claim 8, wherein the first aircraft component is further configured to transmit an outgoing signal to the second aircraft component, wherein the outgoing signal contains the aggregate attitude.

10. The system of claim 1, wherein each aircraft component of the plurality of aircraft components is configured to direct a flight component of a plurality of flight components to produce a response command based on the aggregate attitude, wherein the flight component of the plurality of flight components is attached to an aircraft component of a plurality of aircraft components and is further configured to:
receive an alternate signal from a second aircraft component of the at least an aircraft component; and
command the flight component of a plurality of flight components as a function of the alternate signal.

11. A method of distributed control with supplemental attitude adjustment, comprising:
receiving, by a plurality of aircraft components communicatively connected to a plurality of flight components, the plurality of aircraft components and the plurality of flight components located within an aircraft having an aircraft attitude, an aircraft command, wherein the aircraft command is received from a command sensor attached to an aircraft control;
generating, by the plurality of aircraft components, a response command directing the flight components as a function of an aggregate attitude, wherein the aggregate attitude combines a supplemental attitude with the aircraft attitude.

12. The method of claim 11, further comprising an aircraft control component, the aircraft control component communicatively connected to an aircraft control, the aircraft control component configured to:
calculate the displacement of the aircraft control from a default position;
compare the displacement of the aircraft control against a first threshold; and
transmit an engagement datum to the command sensor indicating that the aircraft control is engaged if the displacement of the aircraft control exceeds the first threshold.

13. The method of claim 12, further comprising:
comparing the displacement of the aircraft control against a second threshold, wherein the second threshold is less than the first threshold; and
transmitting an engagement datum to the command sensor indicating that the aircraft control is disengaged if the displacement of the aircraft control does not exceed the second threshold.

14. The method of claim 11, further comprising generating the supplemental attitude as a function of an engagement datum.

15. The method of claim 14, wherein generating the supplemental attitude further comprises:
determining that an aircraft control of the aircraft is disengaged; and
choosing a position supplemental attitude a function of the determination.

16. The method of claim 14, wherein generating the supplemental attitude further comprises:
determining that an aircraft control of the aircraft is engaged; and
choosing a velocity supplemental attitude as a function of the determination.

17. The method of claim 16, wherein determining the velocity supplemental attitude further comprises:
receiving a desired velocity, the desired velocity including a desired direction of movement;
receiving an actual velocity from a velocity sensor; and
generating a velocity supplemental attitude, comprising:
calculating the difference between the desired velocity and the actual velocity; and
calculating the part of the difference that is perpendicular to the desired direction of movement.

18. The method of claim 11, wherein the plurality of aircraft components comprises a first aircraft component and a second aircraft component, and further comprising:
receiving, at the first aircraft component an alternate signal from the second aircraft component; and
commanding, by the first aircraft component, the flight component as a function of the alternate signal.

19. The method of claim 18 further comprises transmitting, by the first aircraft component, an outgoing signal to the second aircraft component, wherein the outgoing signal contains the aggregate attitude.

20. The method of claim 11, further comprising commanding, by an aircraft component of the plurality of aircraft components, a flight component of a plurality of flight components to produce a response command based on the aggregate attitude, wherein the flight component of the plurality of flight components is attached to an aircraft component of a plurality of aircraft components and is further configured to:
   receive an alternate signal from a second aircraft component of the at least an aircraft component; and
   command the flight component of a plurality of flight components as a function of the alternate signal.

* * * * *